(12) United States Patent
Stephenson

(10) Patent No.: US 7,111,282 B2
(45) Date of Patent: Sep. 19, 2006

(54) INSTRUMENTING A SOFTWARE PROGRAM AND COLLECTING DATA FROM THE INSTRUMENTED SOFTWARE PROGRAM BY TYPE

(75) Inventor: David Arthur Stephenson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 714 days.

(21) Appl. No.: 09/880,327

(22) Filed: Jun. 12, 2001

(65) Prior Publication Data

US 2003/0093772 A1 May 15, 2003

(51) Int. Cl.
*G06F 9/44* (2006.01)

(52) U.S. Cl. ................... 717/130; 717/154
(58) Field of Classification Search ............. 717/130, 717/154
See application file for complete search history.

(56) References Cited

U.S. PATENT DOCUMENTS

| | | | | |
|---|---|---|---|---|
| 5,450,586 A * | 9/1995 | Kuzara et al. | ............. | 717/124 |
| 5,732,277 A * | 3/1998 | Kodosky et al. | ............. | 717/125 |
| 5,768,500 A * | 6/1998 | Agrawal et al. | ............. | 714/47 |
| 5,903,758 A * | 5/1999 | Walker | ............. | 717/130 |
| 5,930,978 A * | 8/1999 | Kim | ............. | 53/390 |
| 5,940,618 A * | 8/1999 | Blandy et al. | ............. | 717/128 |
| 5,960,198 A * | 9/1999 | Roediger et al. | ............. | 717/130 |
| 6,026,236 A * | 2/2000 | Fortin et al. | ............. | 717/127 |
| 6,079,032 A * | 6/2000 | Peri | ............. | 714/38 |
| 6,085,029 A * | 7/2000 | Kolawa et al. | ............. | 714/38 |
| 6,108,700 A * | 8/2000 | Maccabee et al. | ............. | 709/224 |
| 6,149,318 A * | 11/2000 | Chase et al. | ............. | 717/131 |
| 6,189,141 B1 * | 2/2001 | Benitez et al. | ............. | 717/153 |
| 6,263,488 B1 * | 7/2001 | Fortin et al. | ............. | 717/127 |
| 6,311,324 B1 * | 10/2001 | Smith et al. | ............. | 717/114 |
| 6,401,220 B1 * | 6/2002 | Grey et al. | ............. | 714/33 |
| 6,467,052 B1 * | 10/2002 | Kaler et al. | ............. | 714/39 |
| 6,493,868 B1 * | 12/2002 | DaSilva et al. | ............. | 717/105 |
| 6,671,830 B1 * | 12/2003 | Lowell et al. | ............. | 714/39 |
| 6,701,363 B1 * | 3/2004 | Chiu et al. | ............. | 709/224 |
| 6,895,578 B1 * | 5/2005 | Kolawa et al. | ............. | 717/130 |
| 6,898,785 B1 * | 5/2005 | Ramasamy et al. | ............. | 717/129 |
| 6,904,594 B1 * | 6/2005 | Berry et al. | ............. | 718/100 |
| 6,934,935 B1 * | 8/2005 | Bennett et al. | ............. | 717/127 |
| 6,954,922 B1 * | 10/2005 | Liang | ............. | 717/130 |
| 6,954,923 B1 * | 10/2005 | Yates et al. | ............. | 717/130 |
| 6,957,422 B1 * | 10/2005 | Hunt | ............. | 717/130 |
| 6,971,091 B1 * | 11/2005 | Arnold et al. | ............. | 717/145 |
| 2002/0129137 A1 * | 9/2002 | Mills et al. | ............. | 709/224 |

* cited by examiner

*Primary Examiner*—Todd Ingberg

(57) ABSTRACT

The XAM architecture that specifies a software program instrumentation and data collection method and system is disclosed. The XAM architecture includes definition of a measurement type hierarchy, the definition of an XAM API that adapts an application program to a local XAM library, and a message protocol, based on XML, through which the XAM library is configured by, and sends collected data to, an XAM services process. Predefined measurement types include primitive measurement types and aggregate measurement types, the latter allowing for significant decrease in data transmission overheads between the XAM library and the XAM services process because of data filtering and processing by XAM library routines.

19 Claims, 12 Drawing Sheets

INSTRUMENTING A SOFTWARE PROGRAM AND COLLECTING DATA FROM THE INSTRUMENTED SOFTWARE PROGRAM BY TYPE

TECHNICAL FIELD

The present invention is related to the run-time analysis of software programs and, in particular, to a method and system for instrumenting a software program in order to collect data from the software program, locally filter and process the collected data, and package the collected data into the reports that are forwarded to a data analysis program.

BACKGROUND OF THE INVENTION

A wide variety of sophisticated software debugging and analysis tools have been developed during the past forty years to facilitate design, testing, and analysis of software programs. Generally, a software program is developed through an iterative process, each stage of which consists of program design or modification followed by testing and analysis of the program. A commonly encountered technique for analyzing software programs is to embed instrumentation within the program for collecting various types of data while the program is running. Data can be collected and processed in various ways to provide a basis for analyzing the program. Often, embedded instrumentation provides the only practical approach to understanding the real-time behavior of complex programs and automated systems. For example, a running web site may field requests for hypertext markup language ("HTML") documents at a very high rate, and may concurrently store information provided by remote users in a database, conduct commercial transactions with remote users, and perform other such tasks. Although the web site programs may be well tested and understood, the real-time, dynamic environment in which they operate may not be. By instrumenting the web site, web site developers and managers can determine temporal patterns of HTML-page-request reception, statistics on requests received for the HTML pages served, statistics on transactions carried out, and other such information. The collected data can be used to configure the web site to more efficiently handle requests and transactions, to discover program errors, to undertake directed marketing campaigns to advertise underutilized features of the website, and to exploit discovered relationships within purchasing behaviors of different categories of website users for targeted cross-marketing campaigns.

The application response measurement ("ARM") standard was developed as a measurement standard for instrumenting software programs. The ARM standard specifies the semantics of six ARM routines that allow a program developer to embed instrumentation, in the form of transactions, within a program. These transactions can be used to record data and transmit the recorded data to a data processing routine or system for analysis. The ARM standard is relatively simple and easy to use. It allows programmers to construct transaction types suitable for their instrumentation needs, and is therefore adaptable to different measurement tasks, and is widely available.

As a result of its simplicity, the ARM standard suffers from notable deficiencies. First, although many different types of instrumentation might be desirable for inclusion within a program, the ARM standard provides only a transaction measurement type. Second, the ARM standard does not specify many details with regard to encoding and transportation of data, collected via embedded instrumentation from a program, to a data processing and analysis program or system. Third, the ARM standard lacks convenient facilities for locally filtering and partitioning of collected data in order to decrease the data transmission overhead between the running program and a data processing or data analysis program or system and in order to decrease data collection and data processing overhead within the instrumented program and analysis system, respectively. Thus, although the ARM standard has proved to be a valuable and widely used improvement over the various ad hoc instrumentation techniques that preceded the ARM standard, software program developers have recognized the need for a standard, but more completely defined and more flexible software program instrumentation method and system for embedding instrumentation within software programs, collecting data via the embedded instrumentation, packaging the data, and transmitting the packaged data to a data processing and/or data analysis routine.

SUMMARY OF THE INVENTION

One embodiment of the present invention is a well defined and flexible method and system for instrumenting a software program in order to collect various types of data from the running software program. A method and system that represents one embodiment of the present invention, based partly on the Extensible Markup Language ("XML"), are together embodied in an XML Application Response Measurement ("XAM") architecture.

The XAM architecture specifies a fundamental instrumentation entity known as a measurement type. A measurement type is analogous to a class definition in an object-oriented language such as C++ or JAVA. User-defined measurement types, derived from predefined measurement types are defined and instantiated within a software program as a fundamental unit for data collection. The XAM architecture specifies a small number of predefined, primitive measurement types, all hierarchically derived from a single parent measurement type. A measurement type includes variables of predefined variable types.

An application program may assign values to the variables associated with a user-defined measurement-type instance at run time, and may transmit one or more data states representing the values of all variables associated with a user-defined measurement-type instance to an XAM library via an XAM-API interface. The data collected via user-defined measurement types instantiated within an instrumented software program is collected during execution of a software program, filtered, and processed locally by XAM library routines, and packaged into reports that are transmitted by XAM library routines to an XAM service process which analyzes the filtered, processed, and packaged data periodically received from the instrumented software program via the XAM library routines. In one embodiment, reports are XML documents. A simple protocol for configuring data collection and transmitting filtered, processed, and packaged data is defined as part of the XAM architecture. Measurement types include primitive measurement types, such as atomic measurement types, simple transaction measurement types, and polling-based measurement types.

Measurement types also include system-defined aggregate measurement types hierarchically derived from a number of predefined aggregate measurement types that are, in turn, derived from the single parent measurement type, which represent filtering and processing of data collected via primitive measurement types. The XAM library routines automatically derive a set of aggregate measurement types for each user-defined measurement type.

The predefined measurement types provide a rich base for construction of application-program-specific, user-defined measurement types suitable for application-program-specific instrumentation needs. System-defined aggregate measurement types associated with user-defined measurement types, in particular, facilitate local filtering and processing of collected data in order to greatly decrease the data collection, data transmission, and data processing overheads for the data processing and analysis routine or system that collects and analyzes data from an instrumented application program. Use of XML for packaging the data provides a well-defined, flexible, and extensible data transmission methodology.

DETAILED DESCRIPTION OF THE INVENTION

One embodiment of the present invention is a method and system for instrumenting a software program, particularly an application program, and for collecting data generated during running of the application program via embedded instrumentation. The method and system are based on an XML Application Response Measurement ("XAM") architecture. As with any software architecture, there are almost a limitless number of possible XAM architecture implementations. In fact, the XAM architecture may be implemented on top of an ARM implementation, using an existing ARM API. Similarly, an ARM API may be implemented over an XAM implementation. Portions of an example implementation are included, without external annotation or textual description, in Appendix A, while the following discussion is directed to a detailed explanation and description of fundamental XAM architecture concepts. This detailed explanation and description is provided in two subsections that follow: (1) an overview of the XAM architecture with references to FIGS. 1–7; and (2) a detailed, table-based documentation of XAM measurement types and information models.

Overview

Figure 1:
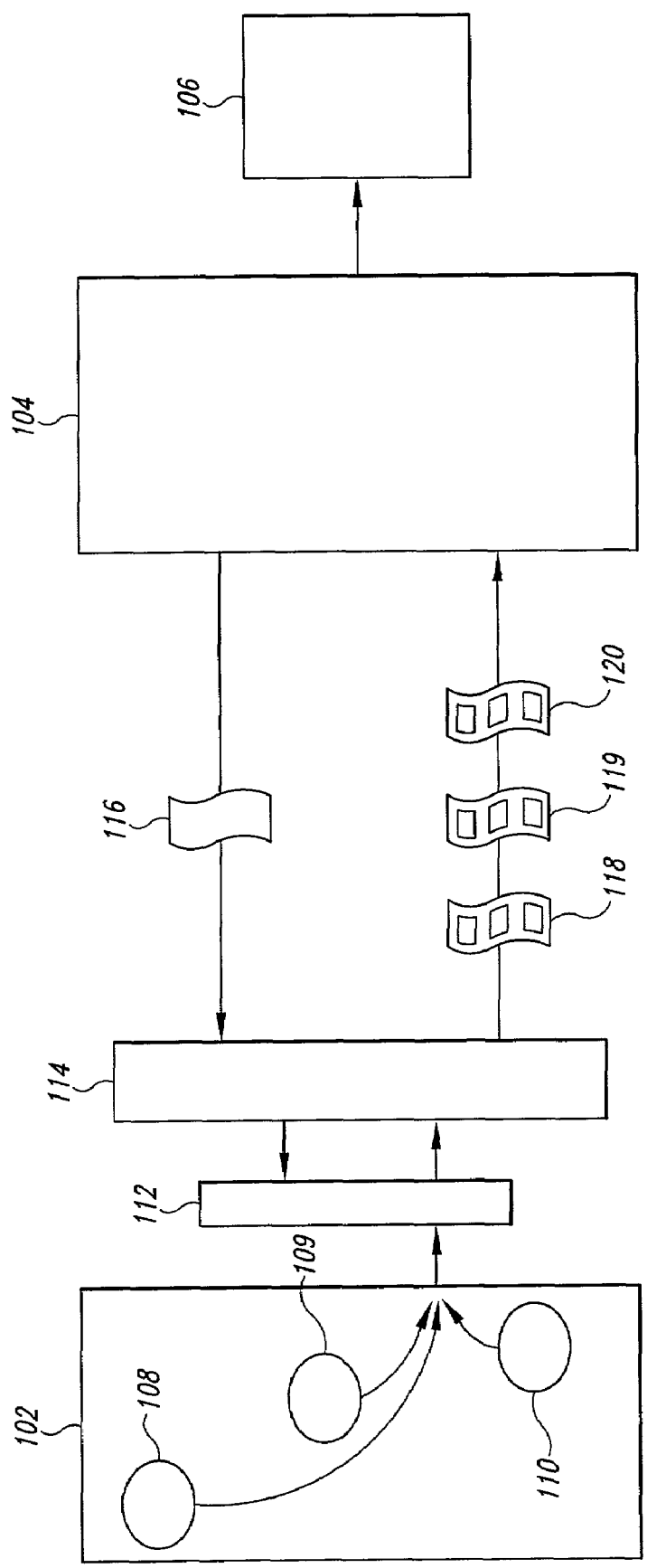
FIG. 1 is a high-level illustration of an XAM-based software program instrumentation system.

FIG. 1 is a high-level illustration of an XAM-based, application-program instrumentation system. The system includes an application program 102 and an XAM service process 104 to which data collected via embedded instrumentation within the application program 102 is transmitted for processing and analysis. The end product of XAM service 104 data processing and analysis may be a summary or report 106 generated by the XAM service. The contents and format of the report, which may be printed, displayed, or stored to a file or database, is specified by XAM services report generation facilities. Alternatively, XAM service processing may be coordinated with an automated application analysis and modification program.

The application program defines one or more user-defined measurement types and includes a number of user-defined-measurement-type instances 108–110 for run-time data collection. Definition of a user-defined measurement type, derived from a predefined, primitive measurement type, involves application program calls to XAM library routines via an XAM application programming interface ("API") 112. The XAM API serves as an adaptor component for interfacing the application program 102 to an XAM library 114. Although it is convenient to assume that the application program 102, XAM API 112, and XAM library 114 reside on a local computer, and the XAM service 104 component resides on a remote computer, all four components may alternatively reside on a single computer system. The XAM library routines may execute within the same process context as the application program 102, or a separate process may execute XAM library routines. Thus, the components of the XAM system illustrates in FIG. 1 may be mapped in various ways onto process contexts within one or more computer systems.

The XAM library 14 stores data structures containing the definitions of the user-defined measurement types, as well as configuration data related to the measurement types. That configuration data may be specified by the XAM services component 104 in an XML-based document 116 transmitted from the XAM services component 104 to the XAM library 114. Data produced by the application program is funneled through the user-defined measurement type instances 108–110 to XAM library routines which store and process the data and report the processed data in XML-based reports 118–120 transmitted at regular intervals from the XAM library 114 to the XAM service component 104. The XAM service component 104 then processes received reports from the XAM library in order to analyze execution of the application program 102. A number of instrumented application programs may concurrently execute and furnish streams of reports to a single XAM services component. In one implementation of the XAM architecture, a single XAM library is resident within a given computer, and is shared by all concurrently executing instrumented application programs.

Figure 2:
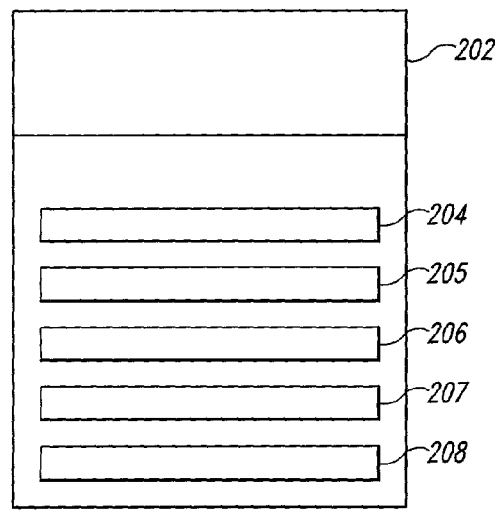
FIG. 2 shows a generalized measurement type.

The fundamental instrumentation entity of the XAM architecture is a measurement type. FIG. 2 shows a generalized measurement type. A measurement type includes measurement-type-specific information 202 and a number of associated variables 204–208. Each user-defined measurement type is derived from a small number of predefined measurement types. An application program defines a user-defined measurement type by selecting one of the predefined measurement types from which to derive the user-defined measurement type, providing a unique name for the user-defined measurement type, and by associating a number of uniquely named variables with the user-defined measurement type. Descriptions of user-defined measurement types are stored in data structures managed by the XAM library. Instances of user-defined measurement types represent embedded instrumentation within an application program. An application program may, at run-time, set and update the values of variables associated with a measurement-type instance, thereby changing the data state of the measurement-type instance, and may transmit the data state of a measurement-type instance one or more times, via the XAM API interface, to the XAM library. The XAM library associates a data state received from the application program with the user-defined measurement type instance corresponding to the data state, and processes the received data state according to processing steps defined for, and associated with, the user-defined measurement type.

Figure 3:
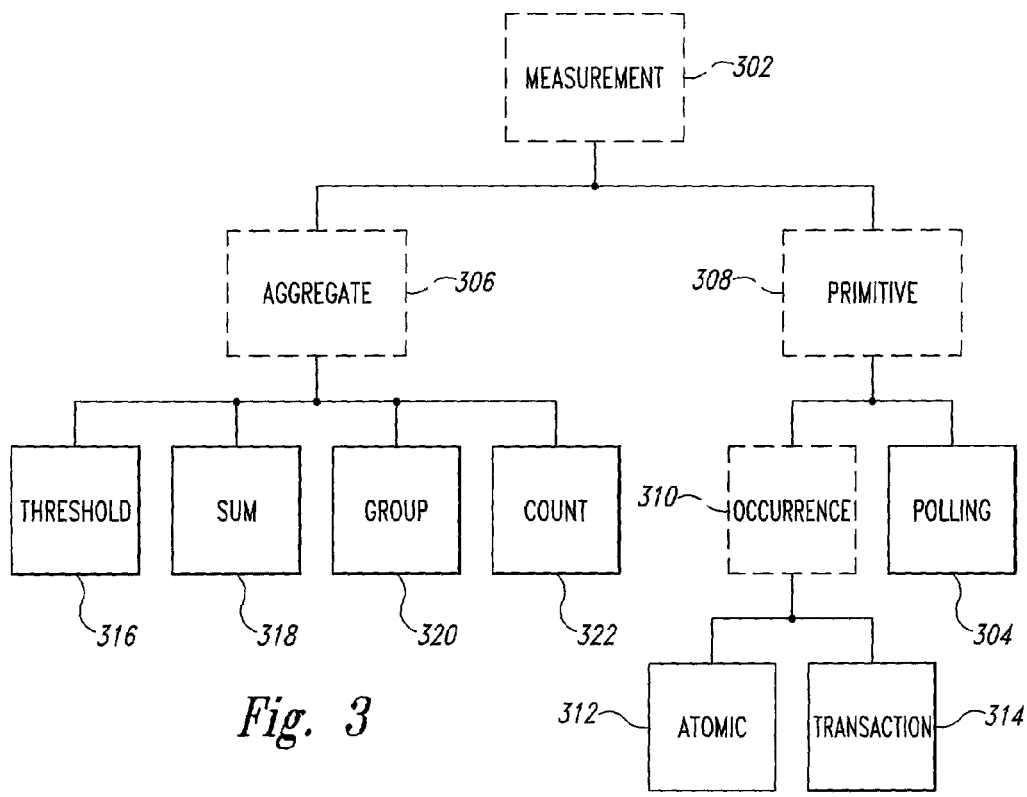
FIG. 3 shows an acyclic graph, or tree, representing the measurement-type hierarchy defined for one embodiment of the present invention.

FIG. 3 shows an acyclic graph, or tree, representing a measurement-type hierarchy of predefined measurement types defined for one embodiment of the present invention. In FIG. 3, abstract measurement types, such as abstract measurement type 302, are represented by rectangles with broken lines, and pre-defined derived measurement types from which users may directly derive user-defined measurement types, called concrete measurement types, are shown as squares with solid borders, such as measurement type 304.

All measurement types are derived from the top-level, abstract type "measurement" 302. Two predefined, abstract measurement types are derived from the top-level measurement type "measurement:" (1) the measurement type "aggregate" 306; and (2) the measurement type "primitive" 308. The measurement type "primitive" 308 is a basic measurement type that provides, at various times during running of an instrumented program, discrete data states comprising the current values of the variables associated with the primitive data type. The primitive measurement type is further divided into subtypes: (1) the abstract measurement type "occurrence" 310 that provide data states that are transferred to the XAM library by the application program at points in time chosen by the application program; and (2) the measurement type "polling," which is a measurement type defined by a user that is interrogated, at regular intervals, for data states by the XAM library. The measurement type "occurrence" is further divided into two subtypes: (1) the measurement type "atomic" 312, data states for which are supplied to the XAM library by the application program at points in time arbitrarily chosen by the application program during the course of execution of the application program; and (2) the measurement type "transaction" 314, an instance of which is started at an arbitrary point in time by the application program and that is ended by the application program at some arbitrary time subsequent to the starting point by the application program, at which point the data state for the transaction measurement type instance is transferred to the XAM library. The XAM library updates a predefined variable "duration" associated with the transaction measurement type instance to a value equal to the elapsed time between starting of the transaction measurement type instance and ending of the transaction measurement type instance by the application program.

Each system-defined aggregate measurement type that inherits from the abstract measurement type "aggregate" 306 is based on a primitive, user-defined measurement type or, in other words, is based on a user-defined measurement type derived from predefined concrete measurement types "atomic," "transaction," or "polling." An aggregate measurement type accumulates data with regard to the primitive measurement type on which it is based for intervals of time defined by configuration parameters transmitted to the XAM library by the XAM service. Aggregate measurement types are not explicitly defined by users. Instead, the XAM library automatically derives aggregate measurement types based on user-defined measurement types. There are four different measurement types, derived from measurement type "aggregate," from which the XAM library automatically derives aggregate measurement types: (1) a measurement type "threshold" 316 that is configured with a threshold test that accepts or rejects data states produced for the primitive measurement type on which the threshold aggregate measurement type is based, and that accumulates the number of data states produced for the primitive measurement type on which the threshold aggregate measurement type is based that are accepted; (2) an aggregate measurement type "sum" 318 that is used to accumulate statistical quantities, such as the sum, average, and standard deviation, of the data states of a variable of the primitive measurement type on which the sum measurement type is based; (3) an aggregate measurement type "group" 320 that counts the number of data states provided by a group of occurrence measurement types; and (4) an aggregate measurement type "count" 322 that counts the number of data states provided by a primitive measurement type during running of an application program. The measurement types illustrated in FIG. 3 are described in greater detail in the following subsection.

FIGS. 4A–I illustrate an example instrumentation of an application program and data collection from the instrumented application program facilitated by the XAM API and XAM library, and transfer of the collected data to an XAM service intercommunicating with the XAM library. All of FIGS. 4A–I employ an identical basic illustration convention. The application program is represented by a vertically oriented rectangle on the left side of the diagram (402 in FIG. 4A), the XAM library is represented by a central, vertically oriented rectangle (404 in FIG. 4A), and the XAM service routine is represented by a vertically oriented rectangle on the right side of the figure (406 in FIG. 4A).

Figure 4A:
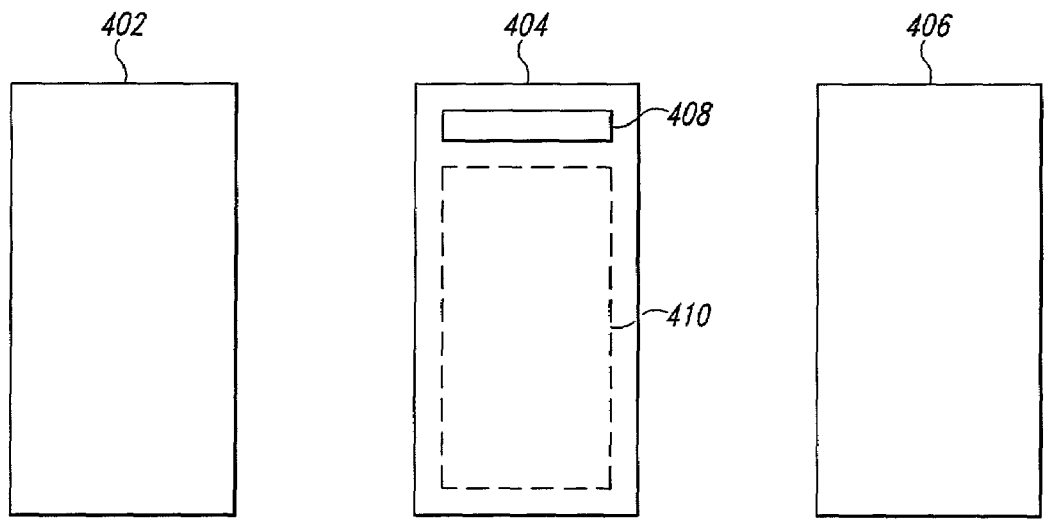
FIG. 4A shows an initial state, prior to instrumentation of an application program.

FIG. 4A shows an initial state, prior to instrumentation of an application program. The XAM library contains a measurement-system-information-model 408 containing a data structure that represents the application program 402, including information related to the identity and address of the application program, an overall reporting interval for data collected from the application program, and other such information. Some of the data values stored in this data structure are application specific, and are not changed subsequently. Other of the values may be changed subsequent to creation of the measurement system information model in order to alter measurement data collection. A more detailed description of the measurement system information model data structure is provided in the following subsection. The XAM library also maintains a catalog that contains details about the instrumentation defined within the application program. In the current example, the catalog is initially empty, because the application program has not yet defined a measurement type instance. The XAM library may maintain these data structures in memory, in non-volatile data storage, or in a combination of memory and non-volatile data storage.

Figure 4B:
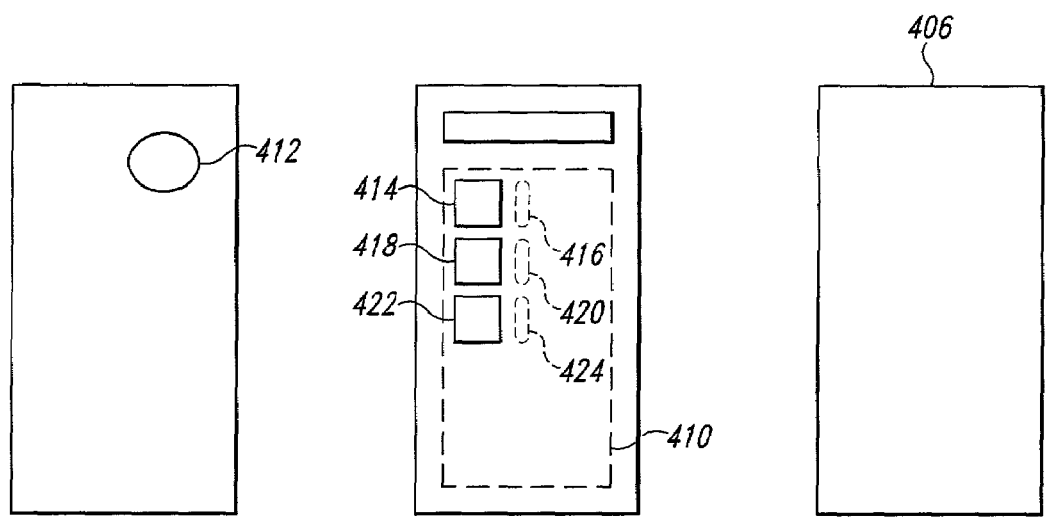
FIG. 4B illustrates instantiation of a user-defined measurement type by an application program.

FIG. 4B illustrates instantiation of a user-defined measurement type by the application program. In FIG. 4B, the application program has defined and instantiated a user-defined measurement type based on one of the concrete, occurrence measurement types shown in FIG. 3. The instantiated, user-defined measurement type 412 is associated with a number of variables and, depending on the predefined measurement type from which the instantiated measurement type is derived, additional user-supplied information. Definition of, instantiation of, the user-defined measurement type each involves invoking one or more XAM API calls, resulting in calling of XAM library routines that support definition and instantiation of the user-defined measurement type 412. The XAM library creates a measurement type information model data structure 414 corresponding to the user-defined measurement type, and creates an additional default measurement request information model data structure 416 associated with the measurement type information model data structure. The measurement type information model data structure 414 includes a type identifier for the user-defined measurement type 412, a list of variables associated with the user-defined measurement type, and other information. The measurement request information model data structure contains fields corresponding to configuration data that may be supplied by the XAM service process 406 prior to data collection and report generation. Additional measurement instance information model data structures, not shown in FIGS. 4A–I, contain data values generated from data states provided, via the user-defined measurement type 412, from the application program during execution. At the same time that the XAM library creates the measurement type information model data structure and the measurement request information model data structure (414 and 416 in FIG. 4B) for the user-defined measurement type instance 412, the XAM library also generates related aggregate measurement type data structures 418, 420, 422, and 424 related to the user-defined measurement type instance 412. In FIG. 4B, several aggregate measurement types based on the user-defined measurement type instance 412 are shown within the XAM catalog 410. The number of aggregate measurement types created by the XAM library for a user-defined measurement type instance depends on the predefined measurement type from which the user-defined measurement type instance is derived and on the number of variables associated with the user-defined measurement type instance. Details of aggregate measurement type creation are provided in the following subsection.

Figure 4C:
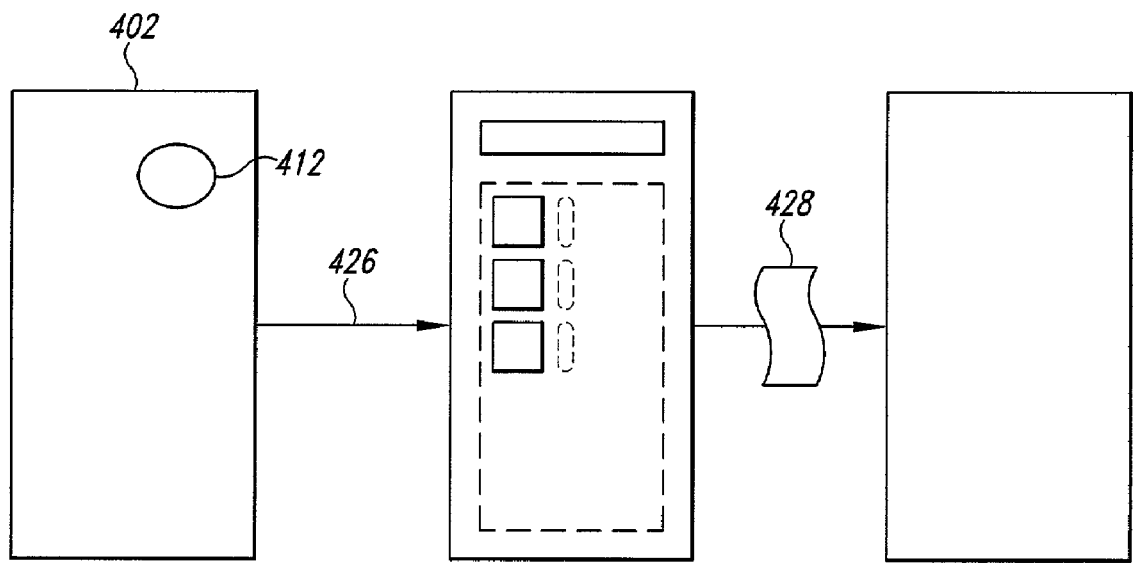
FIG. 4C shows initialization of data collection.

FIG. 4C shows initialization of data collection. Data collection occurs through a protocol defined by the XAM architecture. In the first step of this protocol, the application program 402 invokes an XAM API routine 426 to cause the XAM library to prepare and transmit an init XML document 428 to the SAM service. The init XML document informs the XAM service that the application program is prepared to begin generating data via the user-defined measurement type instance 412. Note that, in the example shown in FIGS. 4A–I, a single user-defined measurement type instance is shown, but an application program may include any number of user-defined measurement-type instances, providing that the application program adheres to certain naming conventions so that the measurement-type instances are distinguishable one from another by the XAM library and XAM service.

Figure 4D:
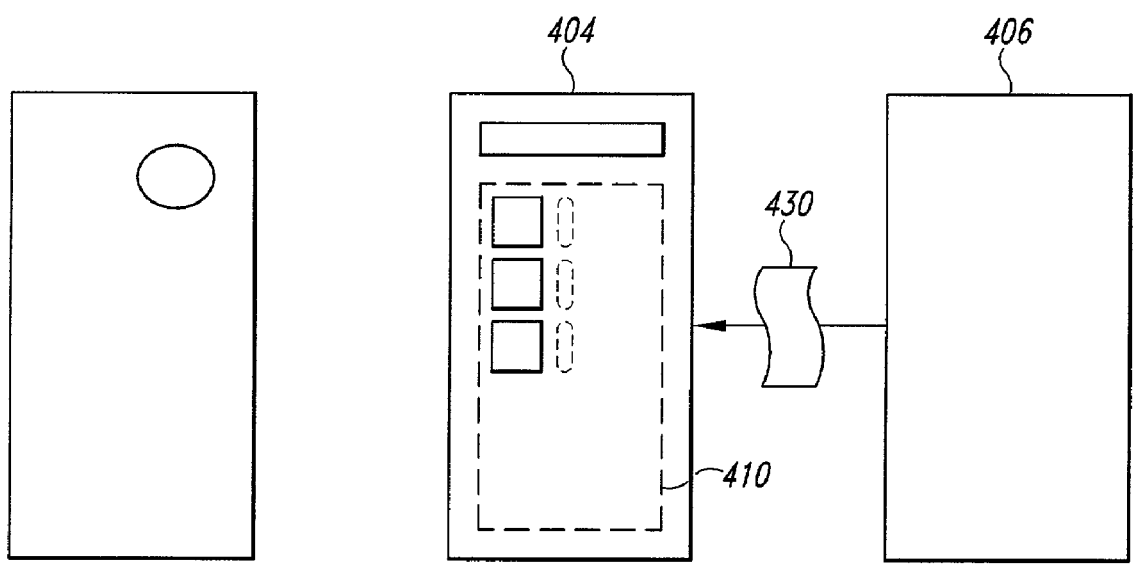
FIG. 4D shows a second step of the XAM data collection protocol.
Figure 4E:
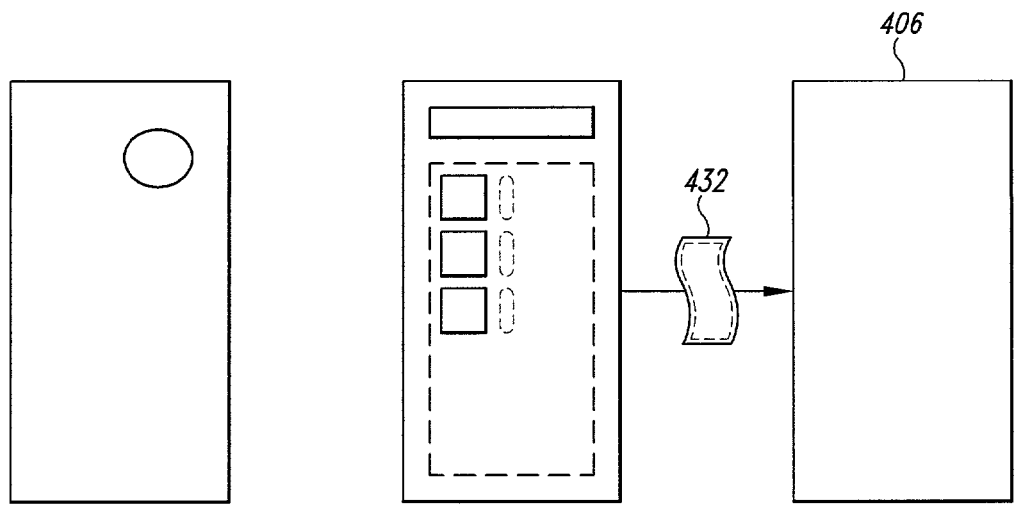
FIG. 4E illustrates transmission, by the XML library, of requested information back to the XAM service in a details XML document.

FIG. 4D shows a second step of the data collection protocol. In FIG. 4D, the XAM service 406 prepares and transmits a request XML document 430 back to the XAM library 404 from which the XAM service received an init XML document (428 in FIG. 4C). The request XML document 430 requests the XAM library to transmit to the XAM service an encoded version of data stored in the measurement system information model 404 and XAM catalog 410 related to the application program that invoked transmission of the init XML document (428 in FIG. 4C). FIG. 4E illustrates transmission, by the XML library, of the requested information back to the XAM service 406 in a details XML document 432 in a third step of the data collection protocol.

Figure 4F:
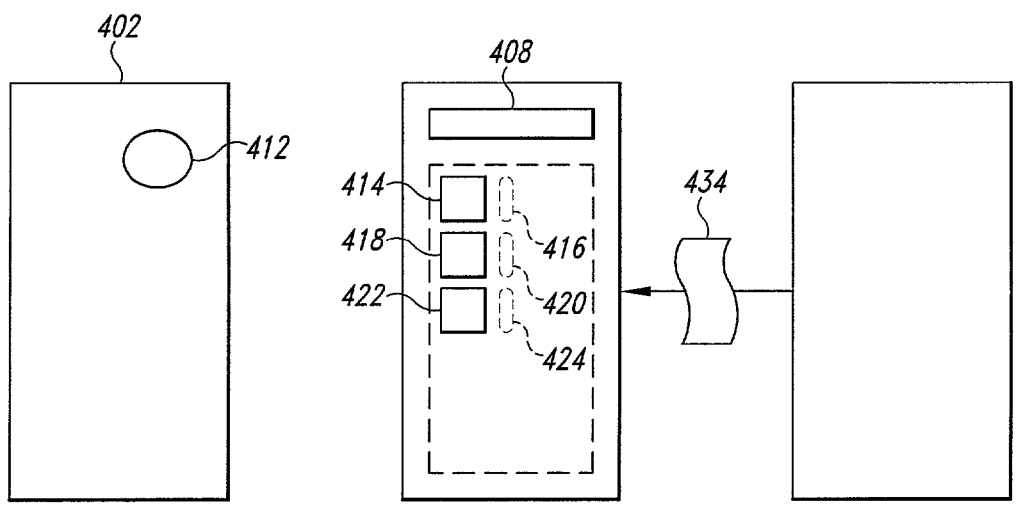
FIG. 4F shows a fourth step of the XAM data collection protocol.

FIG. 4F shows a fourth step of the data collection protocol. In FIG. 4F, the XAM service, having received the details XML document (433 in FIG. 4E) and having processed the information contained in the details XML document, transmits a configure XML document 434 back to the XML library. The configure XML document contains values that the XML library writes into the data structures 408, 414, 416, 418, 420, 422, and 424 maintained by the XML library for the application program 402 and user-defined measurement type instance 412. Thus, the XAM services controls configuration of instrumentation embedded within the application program, controls data collection from the running application program, and controls reports generated by the XAM library and transmitted to the XAM services during data collection via the configuration information contained in the configure XML document 434.

Figure 4G:
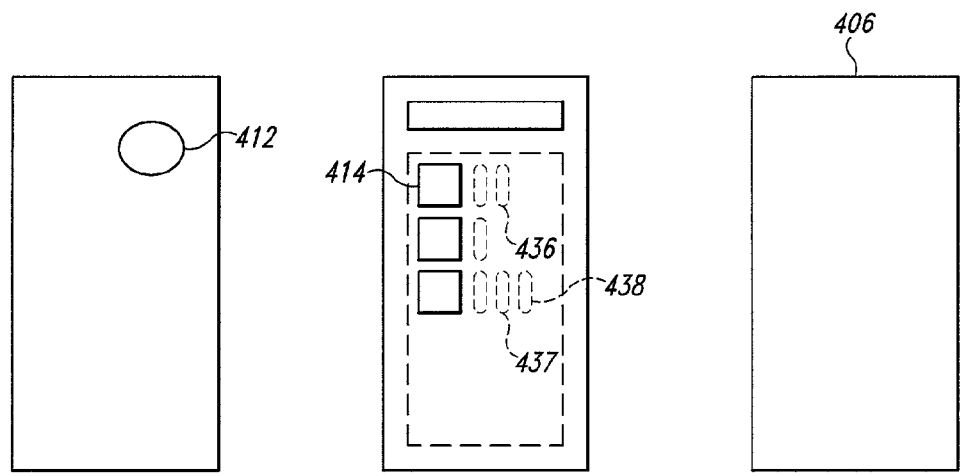
FIG. 4G illustrates the XAM library's processing of a configuration XML document.

FIG. 4G illustrates the XAM library's processing of the configure XML document (434 in FIG. 4F). It should be noted that the XAM services process 406 may define multiple configurations for any user-defined, derived measurement type or aggregate measurement type generated by the XAM library. Thus, multiple data sets can be concurrently generated for the XAM services process from any given user-defined or XAM-library-generated measurement type. The additional configurations are represented by the XAM library as additional measurement-request-information-model data structures 436–438. Thus, viewing the XAM architecture from the perspective of Java or C++ classes, the user-defined measurement type instance 412 and associated measurement type information model 414 are analogous to a class declaration, and each measurement-request-information-model data structure, such as measurement-request-information-model data structure 436, represent an instantiation of the declared class from the perspective of the XAM services process 406. These instantiations can be viewed as separate sources of data streams generated during application program execution. Furthermore, it should be noted that a particular user-defined measurement type is instantiated only once per application program, but that application programs may be multi-threaded, resulting in many thread instantiations, each thread instantiation associated with separate measurement-instance-information model data structures. At a given point in time, there may be as many thread instantiations of a particular user-defined type as there are concurrently executing application threads.

Figure 4H:
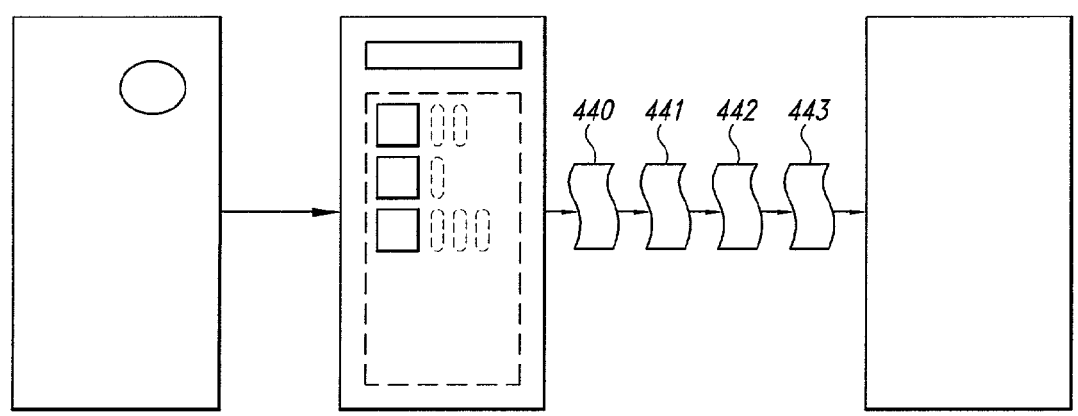
FIG. 4H illustrates the data collection steps of the XAM data collection protocol.

FIG. 4H illustrates data collection steps of the data collection protocol. As the application programs runs, data states are provided by the application program to the XAM library. These provided data states are collated and processed by the XAM library with respect to each relevant measurement-request-information-model data structure, with the data stored in measurement-instance-information-model data structures. The data states are collected by the XAM library and compiled into report XML documents 440–443 at regular intervals. These report XML documents may contain data states or filtered and processed data corresponding to a number of different measurement type instances. The reports continue to be sent to XAM services at regular intervals during execution of the application program.

Figure 4I:
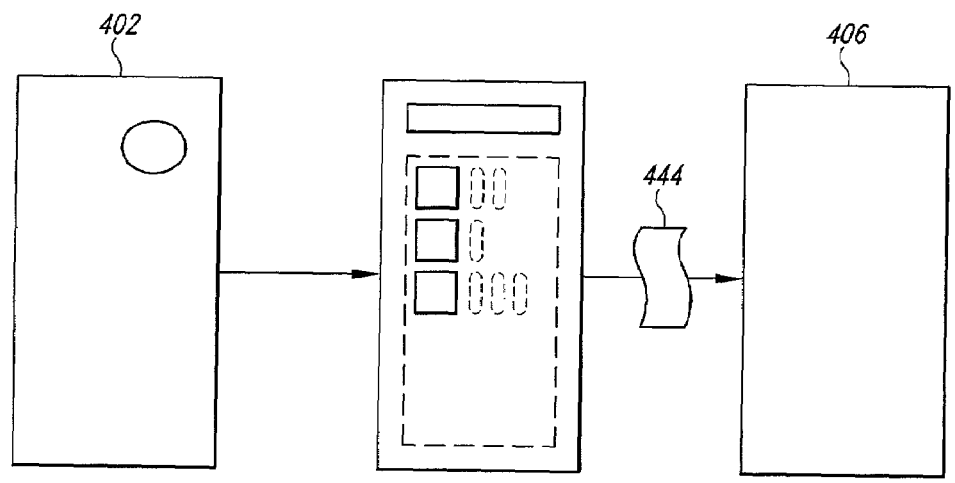
FIG. 4I illustrates termination of data collection according to the XAM data collection protocol.

FIG. 4I illustrates termination of data collection. Either the application program 402 or the XAM services process 406 can terminate data collection via a close XML document. In FIG. 4I, the application program invokes termination via the XAM API, causing the XAM library to prepare and transmit a close XML document 444 to the XAM services process 406.

Figure 5:
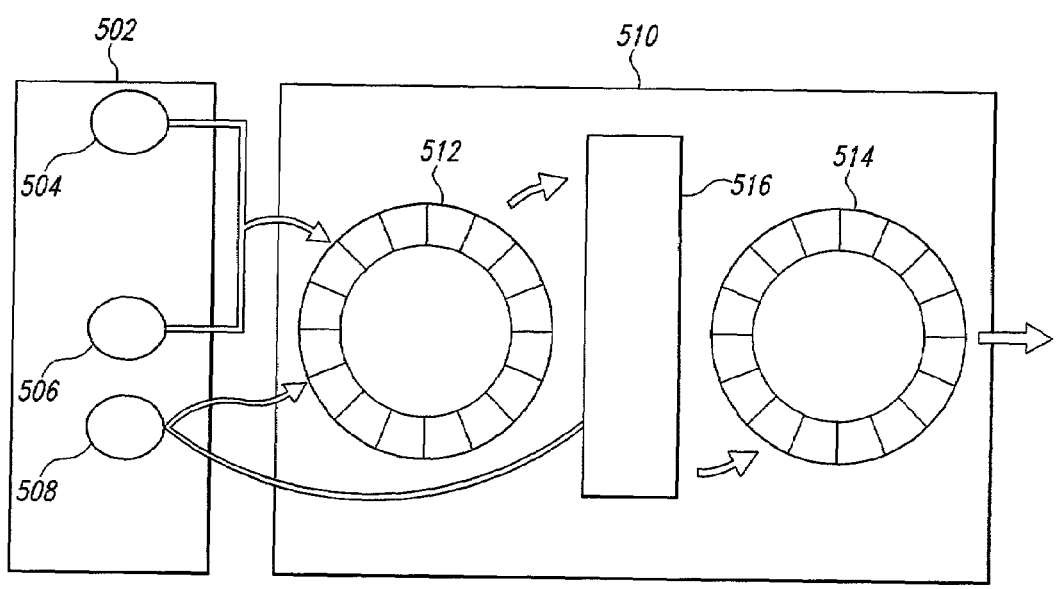
FIG. 5 illustrates the time-dependent operation of the XAM library and provision of data states by instantiated user-defines measurement types within an application program to the XAM library.

FIG. 5 illustrates the time-dependent operation of the XAM library and provision of data states by instantiated user-defines measurement types within an application program to the XAM library. In FIG. 5, the application program 502 is shown to include three different user-defined measurement type instances that are derived from: (1) an atomic-measurement-type instance 504; (2) a transaction-measurement-type instance 506; and (3) a polling-measurement-type instance 508. The XAM library 510 is shown as including an input queue 512 and an output queue 514. Data states transmitted by the user-defined measurement-type instances within the application program 502 are provided by the application program to the XAM library at application-program-determined times, in the case of atomic and transaction measurement-type instances, and at regular intervals, in the case of a polling measurement type instance. These data states are queued to the input queue 512. XAM library routines process data states removed, one after another, from the input queue and queue output data resulting from XAM-library data-state processing to the output queue 514. As described above, the output data is removed from the output queue and packaged into report XML documents that are transmitted at regular intervals to the XAM services process.

An instance of a user-defined measurement type derived from an atomic measurement type may provide data states to the XAM library at arbitrary times during execution of the application program. The application program calls an XAM library routine, via the measurement-type instance, to transfer a data state of the measurement-type instance at points in time deemed appropriate by the application program.

Data states are provided via instances of user-defined measurement types derived from transaction measurement types from a running application program to the XAM library at points in time determined by the application program. However, unlike atomic measurement type instances, data collection from an instance of a user-defined measurement type derived from the transaction measurement type instantiation is started by the application program at a first point in time, after which the application program may alter the value of one or more variables associated with the measurement-type instance, and data collection is then ended at a second point in time by the application program via a call to an XAM library routine. At the point in time that data collection from the transaction measurement type instance is ended by the application program, a data state is transferred from the application program to the XAM library. The XAM library computes a duration, or lapsed time, between the time that data collection from the transaction measurement type instance is started by the application program and the time that data collection from the transaction measurement type is ended by the transaction program, and sets a duration variable automatically associated by the XAM library with the transaction measurement type instance to that computed value.

Data states are obtained by the XAM library from a user-defined measurement type derived from the polling measurement type within an application program at regular intervals. In the case of a user-defined measurement type derived from the polling measurement type, it is the XAM library, rather than the application program, that initiates transfer of the data state from the application program to the XAM library. The polling interval is a configurable parameter configured by the XAM services process.

The processing of data states received and obtained from a running application program is carried out by XAM library routines 516 in order to generate output data to the output queue 514. First, XAM library routines 516 filter the data states according to the variable values that they contain. The XAM services process may configure an almost limitless number of different filters based on variable values in order to partition received data sets into a sub-partition of accepted data sets and a sub-partition of rejected data sets. This initial filtering is an important feature of the XAM architecture, allowing data of interest to be winnowed from a larger amount of data produced by the application program at an early stage, without taxing computational and communications resources by processing the data at later stages.

After filtering the data sets extracted from the input queue 512, the XAM library routines process the accepted data sets according to the measurement-types and configurations of instances from which they are received. It should be noted that a data set may be not only received form a primitive, user-defined measurement type instance, but may also be concurrently associated with an XAM-library-defined aggregate measurement type based on the primitive, user-defined measurement type instance. Thus, each data set may be ultimately associated with multiple measurement type instances. Data sets received from atomic measurement type instances, after filtering, are queued to the output queue as well as used for data processing associated with any aggregate measurement types based on the atomic measurement type. Data sets received from transaction measurement type instances, after filtering, are updated with a computed duration value, and may be queued to the output queue and/or used for data processing associated with aggregate measurement types. Data sets received via polling measurement type instantiations, after filtering, may also be queued to the output queue and/or used for data processing associated with aggregate measurement types based on the polling measurement type.

Aggregate measurement type instances represent an accumulation mechanism for computing derived values from a number of data sets provided by a user-defined measurement type instance on which the aggregate measurement type instance is based. The computed results are output, at regular intervals, by XAM library routines 516 to the output queue 514. Additional levels of filtering may also be accomplished via aggregate measurement type instances, including threshold filtering and TopN filtering. Aggregate measurement types represent a second important feature of the XAM architecture. By configuring an aggregate measurement type, the XAM services process may offload a significant amount of data processing and significantly decrease communications overheads by arranging for the XAM library routines, running locally with the application program, to filter data sets and compute derived results. Thus, for example, if the XAM services process may obtain the accumulated sum of an integer variable associated with a user-defined measurement type instance by using an aggregate measurement type based on that user-defined measurement type instance, allowing the XAM services process to receive incremental sums computed from a larger number of data sets at regular intervals, rather than receiving the larger number of data sets.

Figure 6:
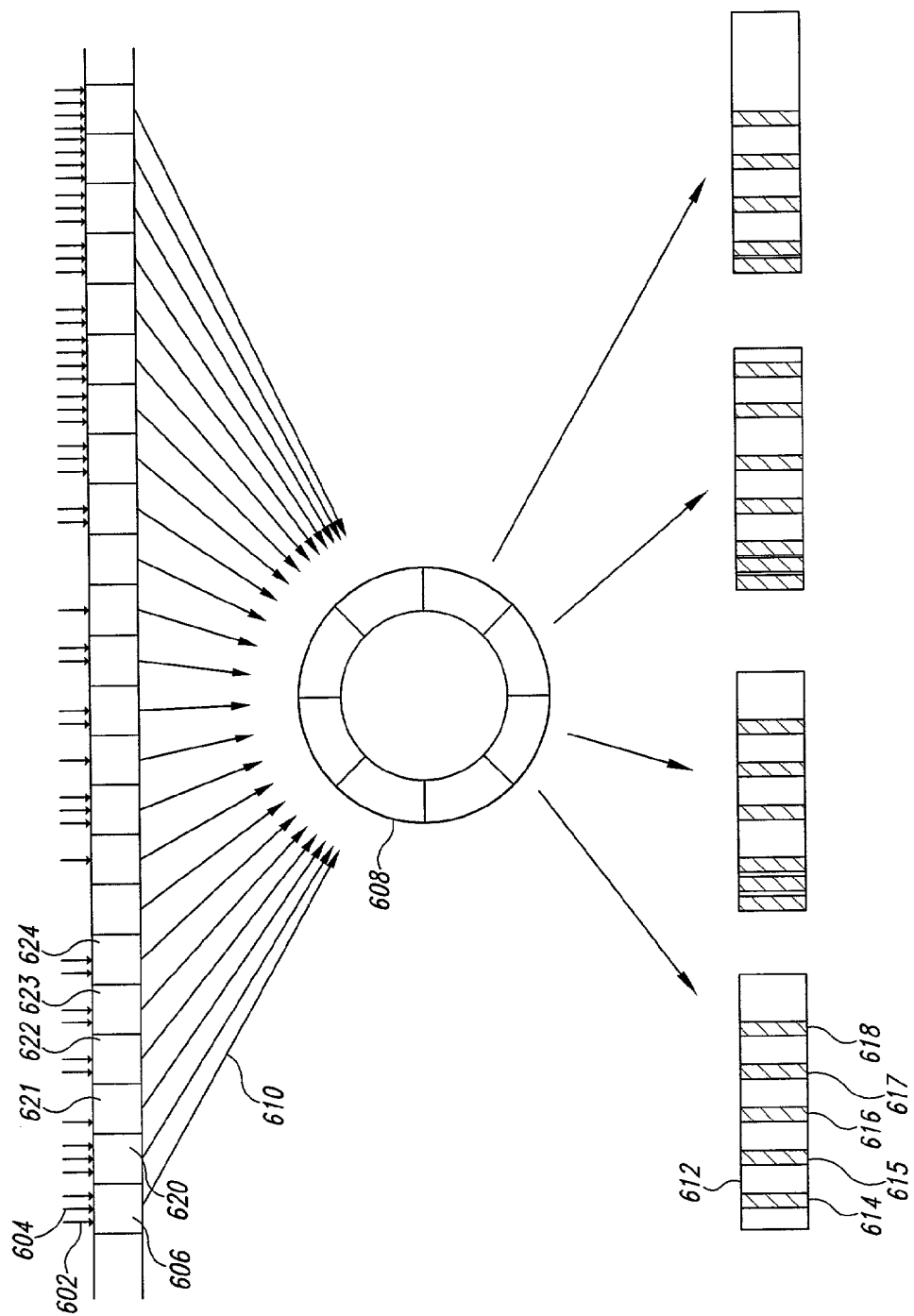
FIG. 6 illustrates the time-dependent data collection behavior of an aggregate measurement type based on an occurrence measurement type.

FIG. 6 illustrates the time-dependent data collection behavior of an aggregate measurement type based on an occurrence measurement type. Data states are provided by the application program via the occurrence measurement type to the XAM library at various times selected by the application program during execution of the application program. These provided data states are represented by small vertical arrows, such as arrow 602. In FIG. 6, an implied timeline stretches horizontally from the left-hand side of FIG. 6 to the right-hand side of FIG. 6. Thus, a first data state is provided by the application program, represented by arrow 602, and a second data state is subsequently provided by the application program, represented by arrow 604. The XAM library accumulates data states provided by the aggregate measurement type, and filters and processes the received data states, within discrete time intervals, each discrete time interval represented in FIG. 6 by a block, such as block 606 representing a first time interval, within a time-ordered sequence of blocks. At the end of each time interval, the accumulated, processed, filtered data collected from the data states provided during that time interval is output to the output queue. Arrows directed from time intervals to the output queue 608 in FIG. 6, such as arrow 610, show output of the processed and filtered data for each time interval. Report XML documents are generated at regular intervals by the XAM library for transmission to the XAM services process. At each interval, the XAM library removes output data queued to the output queue 608 and packages the data into a report XML document, such as report XML document 612. Depending on the relative lengths of the data accumulation interval for the aggregate measurement type instance and the report generation interval, multiple sets of processed and filtered data corresponding to a particular aggregate measurement type instance may be packaged into a single report XML document. For example, in FIG. 6, the processed and filtered data 614–618 collected during intervals 606 and 620–624 are packaged within report XML document 612.

Figure 7A:
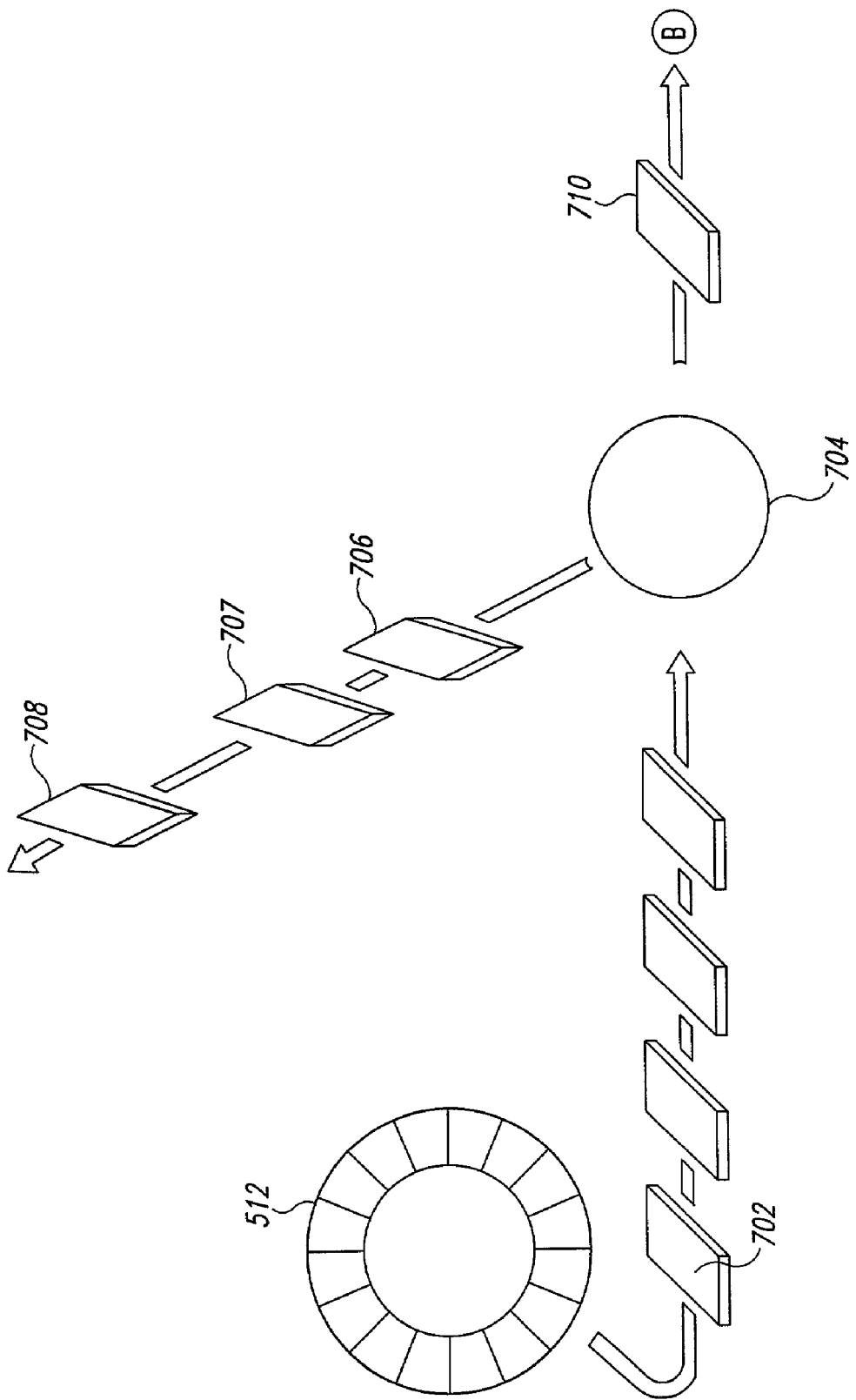
FIGS. 7A–C illustrate data-set processing and filtering carried out by XAM library routines.
Figure 7B:
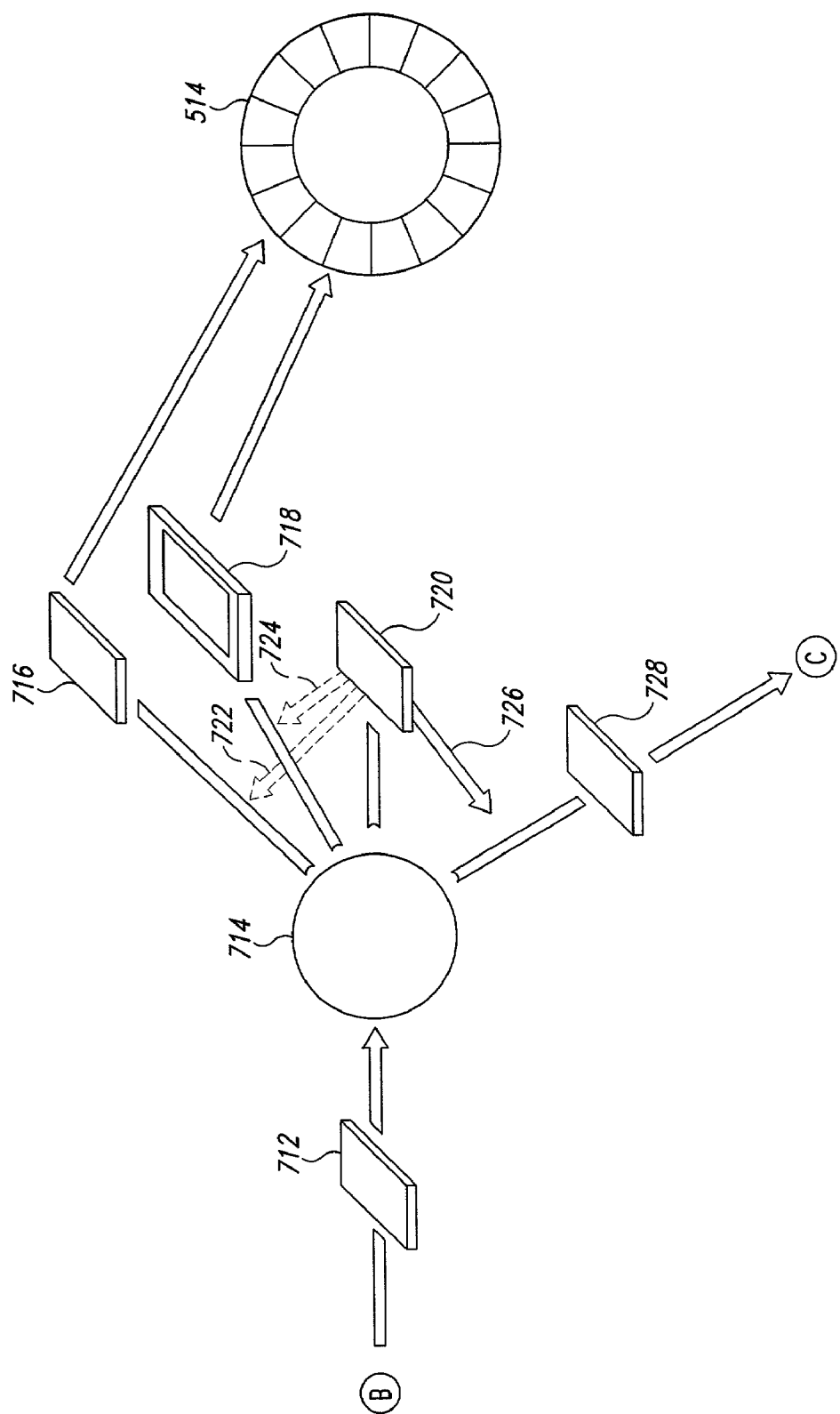
Figure 7C:
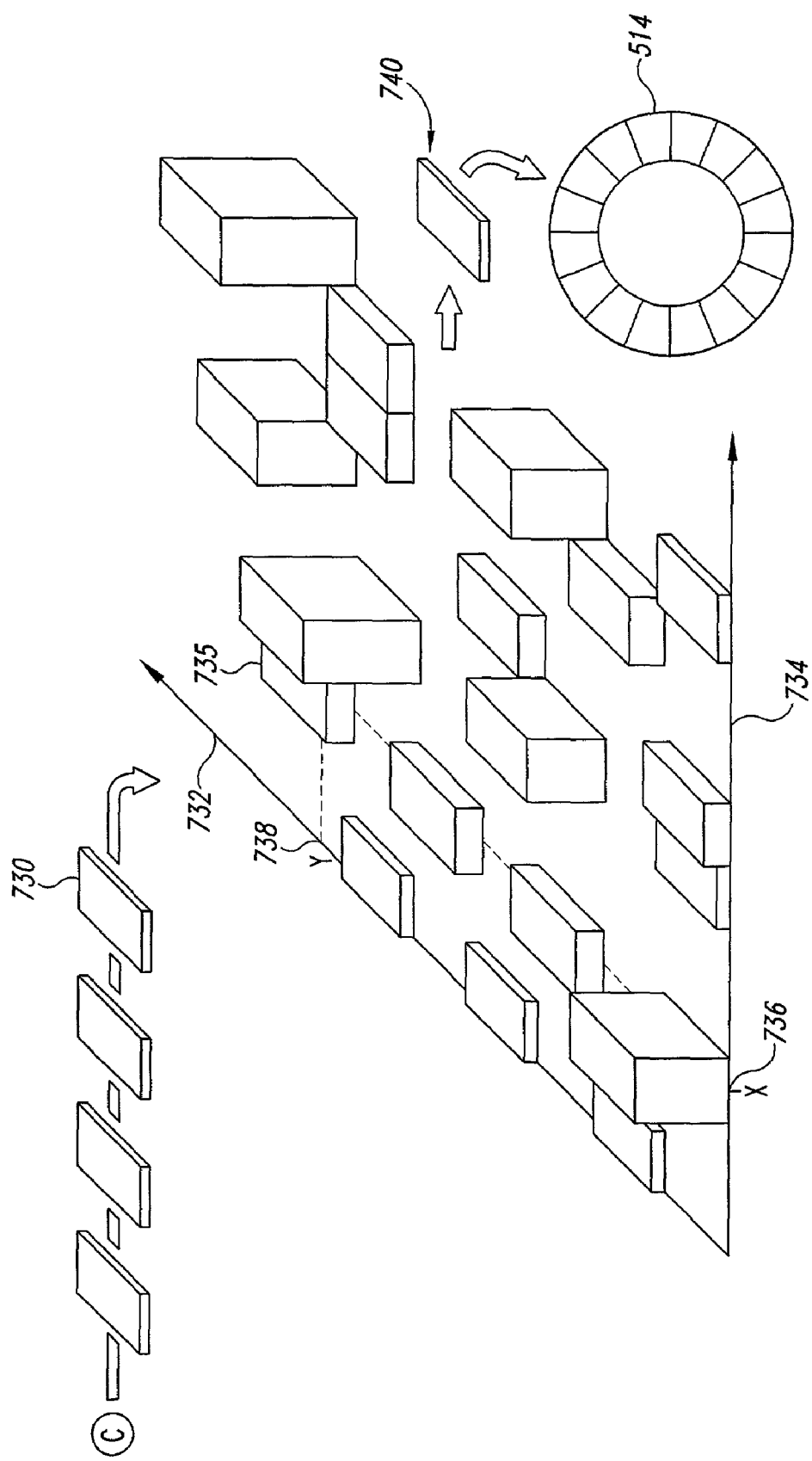

FIGS. 7A–C illustrate data-set processing and filtering carried out by XAM library routines. In other words, FIGS. 7A–C illustrate the processing carried out by XAM library routines 516 in FIG. 5. FIG. 7A shows the first major step in data-set processing. Data sets, represented in FIGS. 7A–C as small rectangular volumes, such as rectangular volume 702, are dequeued by the XAM library routines from the input queue 512. The input queue 512 simply buffers varying rates of data-set production by the application program. In general, data sets are processed as quickly as they are received. The XAM library applies a filter 704 to each data set for which a filter is configured. Filters are associated with measurement request information model data structures, and are thus configurable by the XAM services process. The filtering process employs a variable-value expression that serves as a criteria for accepting or rejecting a data set. For example, if a variable associated with a measurement type instance is the address of a computational entity requesting data from a web server application program, encoded within a string, then a filter may be applied in order to accept data sets with requesting entity addresses within some small subset of a requesting entity address space. Thus, in this case, measurement data would be reported to the XAM services process only for selected requesters. The XAM services process configures the filters for each measurement type instance. Thus, in FIG. 7A, the filtering process 704 applies the filter associated with the measurement type instance from which data sets are received to reject those data sets 706–708 that do not meet the appropriate acceptance criteria, and to accept those data sets 710 that pass the filtering criteria.

FIG. 7B shows a second step in processing data sets by XAM library routines. Those data sets that pass through the first filtering step illustrated in FIG. 7A, such as data set 712, are processed according to the measurement type and measurement type configuration data particular to the data set. Many different types of processing may occur, depending on the measurement type and configuration data stored for the measurement type instance. For example, a data set 716 received from a primitive, user-defined measurement type instance derived from an atomic or polling measurement type, for which no aggregate measurement type is configured, may be formatted and input to the output queue 514. Similarly, a data set received from a user-defined measurement type derived from the transaction measurement type 718, with no configured, associated aggregate measurement type instance, may be updated with a calculated duration value, formatted, and queued to the output queue 514. By contrast, a data set 720 received from a user-defined measurement type instance on which one or more aggregate measurement type instances are based, and configured, may be processed both as a primitive, user-defined measurement type instance, like data sets 716 and 718, as well as processed as a data set corresponding to one or more aggregate measurement types. Thus, in FIG. 7B, the data set associated both with a configured user-defined primitive measurement type instance and a configured, aggregate measurement type instance 720 is directed to processing 722 and 724 as an atomic, polling, or transaction measurement type instance as well as to processing 726 as a data set associated with an aggregate measurement type instance. Finally, a data set 728 may be received from a user-defined measurement type instance which is not configured for directly reporting to the XAM services process, but on which an aggregate measurement type instance is based, and so is processed 726 solely with regard to the aggregate measurement type instance.

FIG. 7C shows processing of data sets with regard to aggregate measurement type instances. In FIG. 7C, data sets associated with aggregate measurement type instances, such as data set 730, are processed according to configuration parameters for one or more aggregate measurement type instances with which they are associated. An aggregate measurement type instance is generally associated with one non-key variable and an arbitrary number of key variables. Depending on the aggregate measurement type, which is discussed in detail in the next subsection, the non-key value may be accumulated in various statistical accumulation values, such as sums, or may be used for applying a threshold filter to determine whether or not to count the data set within an accumulated count of data sets provided via the aggregate measurement type instance. Thus, the non-key variable associated with a measurement type instance may provide the basis for secondary filtering and may be processed and accumulated to produce a value that is reported, at regular intervals, to the XAM services process.

The XAM services process may configure an aggregate measurement type instance to partition the accumulation of data for a particular aggregate measurement type instance into some number of separately accumulated values, using key variable values as partitioning dimensions Thus, for example, if a key variable associated with an aggregate measurement type is a string variable representing the address of an entity requesting a webpage from a web server application, and another key variable for the aggregate measurement type is a string variable representing the requested webpage, then a sum aggregate measurement type may be used to separately count requests from each requesting entity for each webpage served by the web server application. In other words, each key variable may be used to partition the data accumulated for an aggregate measurement type along a single dimension, and the partitioning may be n-dimensional, when n key variables are configured for a particular aggregate measurement type instance. In FIG. 7C, key-variable-based partitioning is shown as 2-dimensional, forming a 2-dimensional grid with vertical axis 732 and horizontal axis 734. A particular data set, such as data set 730, can be used for processing with respect to one of many possible different accumulations maintained by the XAM library for the aggregate measurement type instance with which the measurement type is associated. For example, in FIG. 7C, the key variables associated with the aggregate measurement type instance with which data set 730 is associated has values x and y, and therefore, the non-key value of data set 730 will be processed and accumulated within accumulation 735 designated by the key variable values x 736 and y 738.

Although only a single 2-dimensional partitioning is shown in FIG. 7C, for clarity of illustration, a different n-dimentional partitioning may exist for each configured aggregation measurement type instance. An aggregation measurement type instance can be configured to be partitioned according to any number of key variables, or not partitioned, by the XAM services process.

At regular intervals, one or more output data entries 740 containing accumulated and processed data corresponding to an aggregation measurement type instance, based on data sets received for the aggregation measurement type instance, is output to the output queue 514. For an n-dimensionally partitioned aggregation measurement type instance, multiple data entries are queued to the output queue, one data entry for each accumulation in the n-dimensional accumulation space for that aggregation measurement type instance for which some minimum number of data sets were received during the collection interval. If TopN filtering is configured for the measurement type instance, then data entries are generated for the n partitions for which the most number of data sets were received.

Thus, key-variable-based partitioning provides a way to partition a single accumulated value associated with an aggregate measurement type instance over an n-dimensional accumulation value space, and to report only those slots, or grid-points within the n-dimensional accumulation value space populated by data received in data sets during a collection interval. It is, in effect, analogous to generating an array of data points from multiple numbers, and then compressing the non-zero elements from the array, a well-known technique in computer science applied to sparse arrays. Thus, a total number of data sets received for an aggregate measurement type instance can be filtered by an initial filtering process, shown in FIG. 7A, can be subsequently filtered by a threshold test, in the case of a threshold aggregate measurement type, and can be then partitioned for separate processing by key-variable-based partitioning, and, finally, the partitions can be filtered by TopN filtering. The entire filtering and partitioning mechanism provided by aggregate measurement types thus provides exquisite configurable control over the amount of data generated from a user-defined measurement-type instance embedded in an application program.

Figure 8:
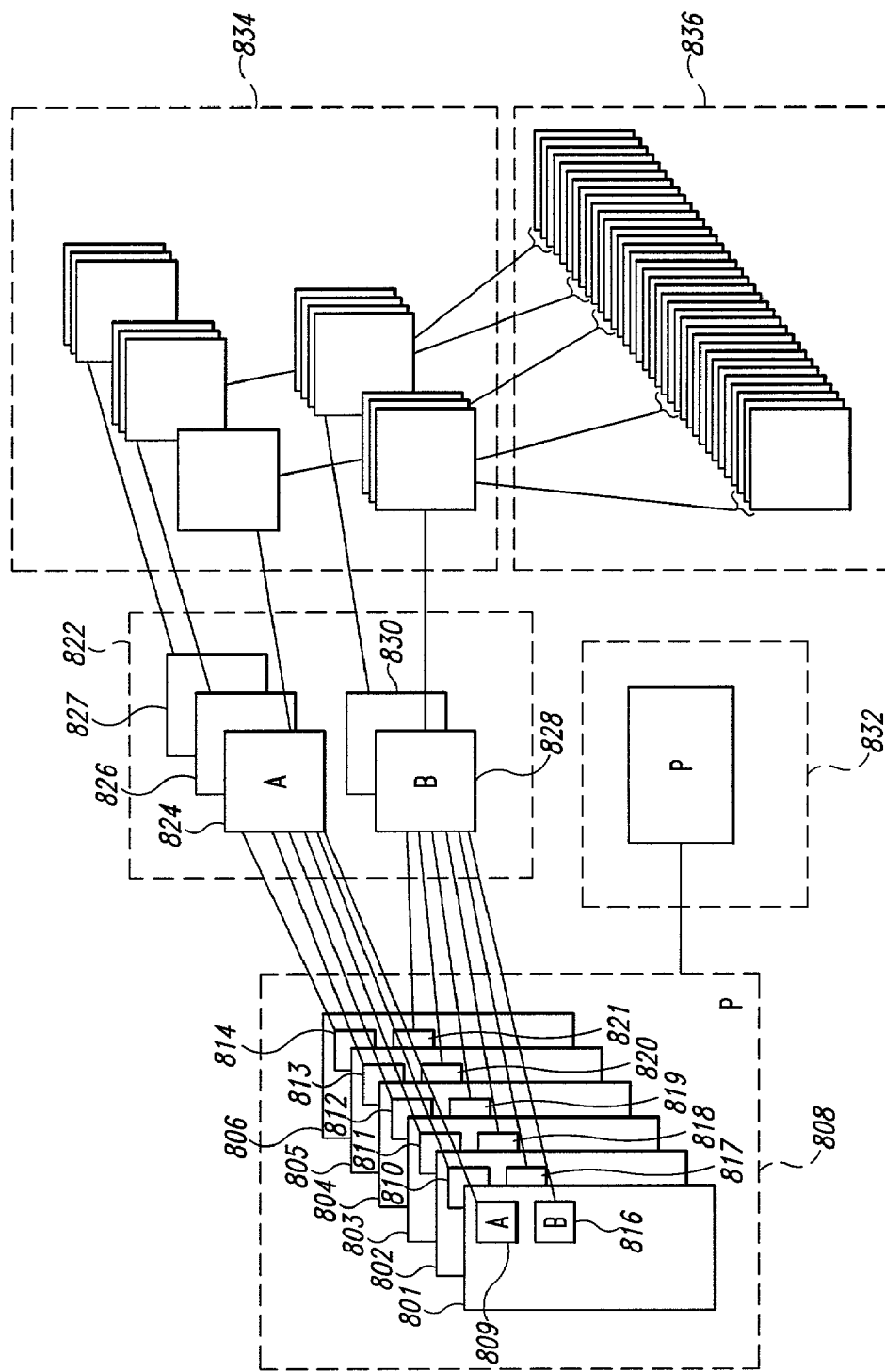
FIG. 8 illustrates the relationships between data structures maintained by the XAM library and application program threads containing instantiated measurement types.

As an introduction to the detailed descriptions in the following subsection, the relationships between data structures maintained by the XAM library and application programs and instantiated measurement types are illustrated in FIG. 8. In FIG. 8, six threads 801–806 of an application program 808 are concurrently running. Each thread of the application program employs instances of two user-defined measurement types: user-defined measurement type "A" 809–814 and user-defined measurement type "B". 816–821. The XAM library contains a measurement type information model 822 that contains data structures describing user-defined measurement type "A" 824, aggregate measurement types based on user-defined measurement type "A" 826–827, user-defined measurement type "B" 828, and an aggregate measurement type based on user-defined measurement type "B" 830. Thus, there is a many-to-one relationship between user-defined measurement type instances within threads of an application program and the data structure maintained within the measurement type information model 822 that represents the user-defined measurement type. The XAM library maintains a measurement system information model 832 that contains a data structure representing the application program 808. Thus, there is a one-to-one relationship between application programs and data structures within the measurement system information models. The XAM library maintains a measurement request information model 834 that may contain an arbitrary number of data structures representing separate configurations made by the XAM services component for each user-defined measurement type. Thus, there is a one-to-many relationship between measurement type information model data structures and measurement request information model data structures. The XAM services component can configure a particular user-defined measurement type multiple times to generate multiple data state streams, each stream subject to different filtering and other configurable parameters. Finally, data sets collected by the XAM library are stored in data structures within the measurement instance information model 836. Thus, there is generally a one-to-many relationship between each separate configuration stored in a data structure within the measurement request information model and data structures within the measurement instance information model 836. The detailed description of these data structures follows, along with additional detailed information.

Documentation of XAM Measurement Types and Information Models

In this subsection, a table-oriented, detailed description of XAM architecture components, introduced in the previous subsection, is provided. Further details are described textually, where appropriate. The table-based presentation is employed to provide a concise, easily accessed reference for XAM architecture details.

Table 1, below, describe the various pre-defined abstract and concrete measurement types discussed in the previous subsection with reference to FIG. 3:

TABLE 1

| Category | Description |
|---|---|
| Measurement | The root of the category hierarchy. |
| Primitive | The root of the measurements that are supplied by the application. |
| Occurrence | Measurements of incidents that happen asynchronously, i.e. some action performed by the application that could occur at any time. |
| Aggregate | Measurements over time period, which collate or sample the primitive measurements. The primitive measurements are Polling and Occurrence and their subcategories. All subcategories of Aggregate can be configured to either report all data over the time period or to report the TopN of the data over the time period (see description of TopN below). |
| Polling | Measurements of things that either are changing too rapidly which must be sampled at some rate to create an aggregate measurement, e.g. free memory, or measurement data, which is available upon request but cannot, for some reason, be asynchronously supplied to the library. |
| Atomic | The concrete subcategory of Occurrence. Can be used to report application actions or measurable events. |
| Transaction | A specialization of Occurrence, which includes a time duration which is calculated by the XAM library. |
| Count | A concrete subcategory of Aggregate. Can be used to report things such as counts of instances of an Occurrence measurement type. |
| Group | A concrete subcategory of Aggregate which reports the frequency of a group of Occurrence measurement types. Each Occurrence type in the group has its own frequency. |
| Sum | A concrete subcategory of Aggregate. Can be used to report summations of variable values from Occurrence instances. Can be used to report the average, minimum, maximum and standard deviation of the variable values. |
| Threshold | A concrete subcategory of Aggregate. It is used to differentiate between good and bad data and count in which case each instance of a value falls. |

Table 2, provided below, lists the type of information that an application program provides via the XAM API in order to define a variable associated with a user-defined measurement type:

TABLE 2

| Field | Possible Values | Comment |
|---|---|---|
| Name | Any combination of alphanumeric characters and '-', '.', '_', ':.' Must start with a letter, e.g. "user_name." | ':' is reserved for use by the XAM system and may not be used in type names specified by the application. Alphanumeric includes Unicode characters not in the ASCII format. |
| Class | One of string, long or double | |
| IsKey | Either true or false | Default false. Variables of class double may not be keys. |
| Alphabet | Either an enumeration of the valid string values or a range list for the long or double, e.g. Enum = {"ready," "running," "stopped"} Range = {"11," "12," "15," "32 ... 126"} | Optional |
| Unit | A string describing the unit of the variable, e.g. "kilos," "sessions," "requests," "seconds" | Optional. If unspecified, the name field is used. |
| Description | Can contain any string. Might contain a URL to a localization service and a message ID, e.g. "the number of users logged in" "http://www.locals-are-us.com/msgId324432432" | Optional. |

The information contained within a measurement type information data structure that is part of the measurement type information model is described in Table 3, below:

TABLE 3

| Category | Name | Class | Description |
|---|---|---|---|
| Measurement | Type Identifier | String | A unique name with which the application identifies a measurement types. Same rules as for the measurement variable name field. |
| | Description | String | A human readable description of the measurement (optional). |
| | Variable Spec | Set of specs as defined in section 0 | A set of variable specifications as described in the previous section. No two variables may have the same name within one type. |
| Aggregate | Derived type ID | String | The Type Identifier of the type which this measurement uses for source data. |
| | Derived variable name | String | The variable within the type which is used as source data for this measurement type. May be empty for certain aggregate categories. |
| Group | Member type Ids | String[] | An array of Type Identifier names one for each member of the group. |

The information contained within data structures of the measurement request information model is provided in Tables 4, below:

TABLE 4

| Category | Name | Class | Description |
|---|---|---|---|
| Measurement | Type Identifier | String | A unique name with which the application identifies a measurement type |
| | Handle | String | A handle set by the XAM service and which is set along with the measurement results |
| | Restriction | String[] | For each variable there may be a restriction. For definition of restriction see below |
| Aggregate | Collapse Dimension | Boolean[] | Indicate to the XAM library if the key field in question is to be used when cutting the data. Default true. See 0 for example of usage. |
| | Aggregate Interval | Double | The time over which this aggregate measurement is to be taken before the aggregate result is calculated. |
| | TopN Size | Long | The maximum number of measurements results to be returned in anyone reporting interval. Range = −1.1 ... 200 |

TABLE 4-continued

| Category | Name | Class | Description |
|---|---|---|---|
| Group | Ignore Members | Boolean[] | Indicates whether the each of the types that make up the group should be included in the group for reporting purposes. |
| Threshold | Threshold Test | A restriction | The test which discriminates the values. |
| Polling | Sample Interval | Double | Seconds between samples. |

The information contained within data structures of the measurement instance information model is provided in Table 5, below:

TABLE 5

| Category | Name | Class | Description |
|---|---|---|---|
| Measurement | Type Identifier | String | This field is defined as part of the measurement type information model and is sent along with every report. |
| | Time Base | Time | The time when this measurement happened. For a transaction this corresponds to the start time. For a polling value it will correspond to the time when the callback method is called. [UTC time string] |
| | Variable Value | Value[] | Either a String Long or a Double |
| Occurrence | Parent Correlator | String | A field which links several different transactions together. Can be used to link up transactions which occur on different entities but which are initiated by the same source. This field may be empty. |
| Transaction | Type Instance Identifier | String | This field is created by the XAM library and may be used as a valid value for part of the parent Correlator field. Any Unicode character is valid except '!.' Should be world and time unique. |
| | Duration | Double | The time between the call to start() and the call to end(). This value is calculated by the XAM library. |
| | Status | String | Whether the transaction was completed successfully on not valid values are "ok" or "failed." |
| Count | Frequency | Long | The number of instances of the occurrence type delivered by the application during the reporting period. |
| Group | Frequency | Long[] | As above for the type within the group. |
| | Identifiers | String[] | The type Identifiers that go with the frequencies above. |
| Sum | Ex | Long | The summation of value of the variable over the reporting period. |
| | Ex2 | Long | The sum of the squares of the variable over the reporting period. |
| | N | Long | The number of variables summed over the reporting period. |

TABLE 5-continued

| Category | Name | Class | Description |
|---|---|---|---|
| | Max | Long | The highest variable during the reporting period. |
| | Min | Long | The lowest variable during the reporting period |
| Threshold | NumberPass | Long | The number of instances in which the value passed the threshold test. |
| | Total Pop | Long | The number of instances of the value that were tested. |

Note that, in general, data accumulated for a sum aggregate measurement type includes components of the data needed to calculate statistical quantities such as average, median, and standard deviation, but not the final statistical quantities. By reporting the components, an XAM services process can calculate a running average, median, and standard deviation over the course of many reports.

The threshold aggregate measurement type may include a configurable restriction which partitions data sets into accepted data sets and rejected data sets. In other words, the restriction represents a threshold test. Types of restrictions, based on variables associated with the primitive measurement type on which the threshold aggregate measurement type is based, are provided below in Table 6:

TABLE 6

| Class of Variable | Restriction | Description |
|---|---|---|
| String | Enumeration | The value of the variable must match one of the elements in the enumeration, e.g. {'ready,' 'running,' 'stopped'} |
| | Prefix | The first characters of the value of the variable must match the complete prefix string. |
| | Postfix | The last characters of the value of the variable must match the complete postfix string. |
| Long or Double | Range set | The value of the variable must lie within the ranges specified. |

Note that a parent transaction measurement type may be correlated to a child transaction measurement type via a correlator, allowing for creation of additional aggregate measurement types. The correlator contains fields that identify the parent transaction measurement type, including: (1) a system identifier; (2) a system instance identifier; (3) a type identifier; and (4) a type instance identifier. These fields are encoded within a Unicode string that identifies the parent transaction to the XAM library when the child transaction is started. The notion of transaction correlators occurs in the ARM standard.

The information stored within a data structure of the measurement system information model is provided below in Table 7:

TABLE 7

| System field name | Description | Class | Changeable |
|---|---|---|---|
| Enable | Boolean field, which controls if any measurement reports are generated by the application. Default is true. | Boolean | Yes |

TABLE 7-continued

| System field name | Description | Class | Changeable |
|---|---|---|---|
| Service Identifier | The name of the application or service will be the same for all instances of the service that ever run, e.g. "virtual file system version 1.5.4." Any Unicode character is valid except '!.' | String | No |
| Service Instance Identifier | A string that will uniquely identify the instance of the application or service, e.g. "15.144.69.2:pid + 1234." Any Unicode character is valid except '!.' | String | No |
| Service Description | A description of the service or application or a URL to a localization service and a message ID. | String | No |
| Clock Resolution | The smallest period of time that the library can measure in seconds. | Double | No |
| MinReportInterval | Time is seconds between the application sending measurement reports. If this is set to zero, then a report will be sent as soon as measurement data is available. Values above zero allow the application to bundle up several measurements into a single XML report documents. Default is 5 seconds. | Long | Yes |

As described in the overview subsection, the XAM library automatically creates aggregation measurement types corresponding to each user-defined primitive measurement type. Pseudocode expressing automatic aggregation measurement type creation by the XAM library is provided below:

```
For all concrete, primitive measurement types (T) {
    Register a measurement type of category Count
        with TypeID = 'T-Count'
        with Variables = key variables from T
        with DerivedTypeID = T
    Register a measurement type of category Threshold
        with TypeId = 'T-Threshold'
        with Variables = key variables from T
        with DerivedTypeID = T
    Within T For each non key non string variable (V): {
        Register a measurement type of category Sum
            with TypeId = 'T-Sum-V'
            with Variables = key variables from T
            with DerivedTypeID = T
            with Derived VariableName = V
    }
}
For all transaction measurement types (T) {
    Within T For each calculated variable (V): {
        Register a measurement type of category Sum
            with TypeId = 'T-Sum-V'
            with Variables = key variables from T
            with DerivedTypeID = T
            with Derived VariableName = V
    }
}
```

In Table 8, below, an example set of user-defined primitive measurement types is provided:

TABLE 8

| | | Variables | | | | |
|---|---|---|---|---|---|---|
| Category | Type name | Name | Class | IsKey | Alphabet | Unit |
| Polling | Disk_utilization | Utilization | Double | No | 0 . . . 100 | percent |
| | | Disk | Long | Yes | 1 . . . i | |
| | | User | String | Yes | | |
| Transaction | Download_file | File_name | String | No | | |
| | | File_type | String | Yes | | |
| | | Size | Long | No | | |
| | | Invoker_ID | String | Yes | | |
| | | Duration | Double | No | 0 . . . i | second |
| | | Size by duration | Double | No | | Bytes/second |
| Atomic | Security_Authorization_failure | Conversation_type | String | Yes | | |
| | | Document_type | String | Yes | | |
| | | Invoker_ID | String | Yes | | |
| | | Recipient_ID | String | Yes | | |
| | | Reason | String | Yes | | |

Table 9, below, shows the aggregate measurement types automatically generated by the XAM library for the primitive measurement types shown in Table 8, above:

TABLE 9

| Category | Type name | Variables | | | | |
| --- | --- | --- | --- | --- | --- | --- |
| | | Name | Class | IsKey | Alphabet | Unit |
| Sum | Disk_utilization:Sum:Utilization | Disk | Long | Yes | 1 . . . i | |
| | | User | String | Yes | | |
| Threshold | Disk_utilization:Threshold | Disk | Long | Yes | 1 . . . i | |
| | | User | String | Yes | | |
| Count | Disk_utilization:Count | Disk | Long | Yes | 1 . . . i | |
| | | User | String | Yes | | |
| Count | Download_file:Count | File type | String | Yes | | |
| | | Invoker ID | String | Yes | | |
| Sum | Download_file:Sum: Duration | File type | String | Yes | | |
| | | Invoker ID | String | Yes | | |
| Sum | Download_file:Sum:size | File type | String | Yes | | |
| | | Invoker ID | String | Yes | | |
| Sum | Download_file:Sum: Size_by_duration | File type | String | Yes | | |
| | | Invoker ID | String | Yes | | |
| Threshold | Download_file:Threshold: | File type | String | Yes | | |
| | | Invoker ID | String | Yes | | |
| Count | Security_Authorization_ failure:Count | Conversation type | String | Yes | | |
| | | Document type | String | Yes | | |
| | | Invoker ID | String | Yes | | |
| | | Recipient ID | String | Yes | | |
| | | Reason | String | Yes | | |
| Threshold | Security_Authorization_ failure:Threshold | Conversation type | String | Yes | | |
| | | Document type | String | Yes | | |
| | | Invoker ID | String | Yes | | |
| | | Recipient ID | String | Yes | | |
| | | Reason | String | Yes | | |

An example XAM implementation is provided below in Appendix A. This example implementation includes explanatory internal comments, but is not further externally annotated. The example implementation is provided in Appendix A for the sake of completeness, as an additional XAM architecture reference, and as a guide for XAM architecture implementation.

Although the present invention has been described in terms of a particular embodiment, it is not intended that the invention be limited to this embodiment. Modifications within the spirit of the invention will be apparent to those skilled in the art. For example, an almost limitless number of XAM implementations are possible, using any number of programming languages, modular organizations, data structures, and software design strategies. A large number of implementation strategies may be employed, including full de novo implementation and implementation based on an existing ARM API. As discussed above, many different mappings of XAM functionality onto computers and operating-system services are possible. The predefined measurement type hierarchy can be easily extended to include additional abstract and concrete measurement types in order to provide additional types of measurement collection and processing. The description of one embodiment of the XAM architecture, above, is based on instrumentation of application software programs, but XAM systems can be developed to instrument virtually any type of software program.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

Appendix A

A. Example XML Documents

Below are example instances of each document type:

*B.      Init*

The "init" document contains the name of the application and a human readable description.

```xml
<?xml version="1.0" ?>
<xamInit xmlns="http://www.e-speak.net/schema/XAM/init">
        <serviceName>Virtual File System:version 3.3</serviceName>
        <serviceInstanceIdentifier>IP15.144.65.2:pid=432</serviceInstanceIdentifier>
</xamInit>
```

*C.      Request*

The "request" document details what is required.

```xml
<?xml version="1.0"?>
<xamRequest xmlns="http://www.e-speak.net/schema/XAM/request" >

<informationModel>typeCatalog</informationModel>
        <informationModel>configurationList</informationModel>
        <informationModel>systemVariables</informationModel>
</xamRequest>
```

*D.      Details*

The "details" document describes the current model state.

```xml
<?xml version="1.0"?>
<xamDetails xmlns="http://www.e-speak.net/schema/XAM/details">
        <systemVariables>
                        <!--   enable content is a boolean java object    -->
                <enable>true</enable>
                <serviceIdentifier>2nd Virtual File System:version 3.2</serviceIdentifier>
                <serviceInstanceIdentifier>2nd IP15.144.65.2</serviceInstanceIdentifier>
                <clockResolution>2nd 0.015</clockResolution>
                        <!--   minReportInterval content must be a long java object   -->

<minReportInterval>55555</minReportInterval>
        </systemVariables>
        <typeCatalog>
                <transaction>
                        <!-- Order of elements within any container -->
                        <!--      is not garunteed -->
                <typeIdentifier>Download_file</typeIdentifier>
                <description> file downloaded from the service</description>

<variableSpec>
                        <name>2nd File_name</name>
                        <class>string</class>
                        <key>true</key>
                </variableSpec>
                <variableSpec>
                        <name>2nd size</name>
                        <key>false</key>
                        <class>string</class>
                        <unit>2nd bytes</unit>
                </variableSpec>
                <variableSpec>
                        <name>2nd size</name>
                        <key>false</key>
                        <class>string</class>
                                <!--   unit is optional   -->
                        <unit>2nd bytes</unit>
                                <!--   description is optional   -->
                        <description>sampling frame</description>
                </variableSpec>
                <variableSpec>
                        <name>File_name</name>
                        <!--    element "class" content must be "string" since   -->
                        <class>string</class>
                        <!--    key is optional, key content must be boolean     -->
                        <key>false</key>
                        <alphabet>
                                <enum>1st apple</enum>
                                <enum>1st orange</enum>
                        </alphabet>
                        <unit>transaction_interval</unit>
                        <description>sampling frame</description>
                </variableSpec>
                <variableSpec>
                        <name>2nd aLongKeyVar</name>
```

```xml
                        <!-- "class" content must be long since -->
                        <!--    element range is used below     -->
                <class>long</class>
                <key>true</key>
                <alphabet>
                        <range>2nd 0..100</range>
                        <range>2nd 200..i</range>
                </alphabet>
                <unit>2nd percent</unit>
                <description>2nd (B.) NO BUGS </description>
        </variableSpec>
</transaction>
<count>
        <typeIdentifier>2nd testAtomic:count</typeIdentifier>
        <derivedTypeIdentifier>2nd testAtomic</derivedTypeIdentifier>

<variableSpec>
                <name>2nd aLongKeyVar</name>
                <class>long</class>
                <key>true</key>
                <alphabet>
                        <range>2nd 0..100</range>
                        <range>2nd 200..i</range>
                </alphabet>
                <unit>2nd percent</unit>
                <description>size the file downloaded</description>
        </variableSpec>
        <variableSpec>
                <name>2nd aLongKeyVar</name>
                <class>long</class>
                <key>true</key>
                <alphabet>
                        <range>2nd 0..100</range>
                        <range>2nd 200..i</range>
                </alphabet>
                <unit>2nd percent</unit>
                <description>2nd (B.) NO BUGS </description>
        </variableSpec>
        <variableSpec>
                <name>2nd File_name</name>
                <class>string</class>
                <key>true</key>
        </variableSpec>

</count>

<sum>
        <variableSpec>
                <name>2nd File_name</name>
                <class>string</class>
                <key>true</key>
        </variableSpec>
        <variableSpec>
                <name>2nd aStringKeyVar</name>
                <class>string</class>
                <key>true</key>
                <alphabet>
                                <!-- Content must be unique -->
                        <enum>apple1</enum>
                        <enum>orange1</enum>
                        <enum>apple2</enum>
                        <enum>orange2</enum>
                </alphabet>
                <unit>2nd percent</unit>
                <description>2nd the user utilizing the disk</description>
        </variableSpec>
        <variableSpec>
                <name>2nd aStringVar</name>
                <class>string</class>
                <key>false</key>
                <alphabet>
                        <enum>apple</enum>
                        <enum>orange</enum>
                </alphabet>
                <unit>percent</unit>
                <description>the user utilizing the disk</description>
        </variableSpec>
        <variableSpec>
                <name>2nd aLongKeyVar</name>
                <class>long</class>
                <key>true</key>
                <alphabet>
```

```xml
                            <!-- Content must be unique -->
                <range>0..100</range>
                <range>200..i</range>
                <range>400..450</range>
                <range>2nd 200..i</range>
                <range>0..101</range>
                <range>2rd 200..i</range>
            </alphabet>
            <unit>2nd percent</unit>
            <description>2nd (B.) No BUGS </description>
        </variableSpec>
        <typeIdentifier>2nd testTransaction:sum:aLongVar</typeIdentifier>
        <derivedTypeIdentifier>2nd testTransaction</derivedTypeIdentifier>
        <derivedVariableName>2nd aLongVar</derivedVariableName>
    </sum>

<atomic>
        <typeIdentifier>testAtomic</typeIdentifier>
        <description>a test atomic</description>
        <variableSpec>
            <name>aStringVar</name>
            <class>string</class>
            <key>false</key>
            <alphabet>
                <enum>apple</enum>
                <enum>orange</enum>
            </alphabet>
            <unit>percent</unit>
            <description>the user utilizing the disk</description>
        </variableSpec>
    </atomic>

<poll>
        <typeIdentifier>testPolling</typeIdentifier>
        <description>a Polling test</description>
    </poll>
    <poll>
        <typeIdentifier>testPoll</typeIdentifier>
        <description>a bigger poll test </description>
        <variableSpec>
            <name>aStringVar</name>
            <class>string</class>
            <key>false</key>
            <alphabet>
                <enum>polled_apples</enum>
                <enum>polled_oranges</enum>
            </alphabet>
            <unit>percent</unit>
            <description>the user polling a service</description>
        </variableSpec>
    </poll>
    <!-- threshold not shown here:    -->
    <!-- group     not shown here: -->
</typeCatalog>
<configList xmlns="http://www.e-speak.net/schema/XAM/configure" >
    <sum>
        <handle>2888hfshgfh-sd/handle>
        <typeIdentifier>test sum:Duration</typeIdentifier>
        <aggregationInterval>20000.0</aggregationInterval>
    </sum>
    <sum>
        <handle>2888888888888</handle>
        <typeIdentifier>test sum:Duration</typeIdentifier>
        <aggregationInterval>20000.0</aggregationInterval>
    </sum>
    <sum>
        <handle>2999999999999</handle>
        <typeIdentifier>2nd_sum </typeIdentifier>
        <aggregationInterval>200.0</aggregationInterval>
    </sum>
    <transaction>
        <handle>100</handle>
        <typeIdentifier>Tran_2</typeIdentifier>
        <restriction> TRUE </restriction>
    </transaction>
    <poll>
        <handle>2</handle>
        <typeIdentifier>Poll_2</typeIdentifier>
        <callbackInterval>2</callbackInterval>
    </poll>
    <atomic>
        <handle>22</handle>
```

```xml
            <typeIdentifier>Security_Authorization_failure</typeIdentifier>
            <restriction> False </restriction>
        </atomic>
        <poll>
            <handle>3</handle>
            <typeIdentifier>Poll_3</typeIdentifier>
            <callbackInterval>3</callbackInterval>
        </poll>
    </configList>
</xamdetails>
```

E. Configure

The "configure" document details the settings which the XAM library should use.

```xml
<?xml version="1.0"?>
<xamConfigure xmlns="http://www.e-speak.net/schema/XAM/configure">
    <systemVariables>
        <enable>true</enable>
        <minReportInterval>15</minReportInterval>
    </systemVariables>
    <configList>
        <transaction>
            <handle>1</handle>
        </transaction>
        <transaction>
            <handle>2</handle>
        </transaction>
        <transaction>
            <handle>1</handle>
            <!-- optional element -->
            <typeIdentifier>DownLoad_file</typeIdentifier>
        </transaction>
        <transaction>
            <handle>2</handle>
            <typeIdentifier>DownLoad_file</typeIdentifier>
        </transaction>
        <transaction>
            <handle>100</handle>
            <typeIdentifier>Tran_2</typeIdentifier>
            <restriction> TRUE </restriction>
        </transaction>
        <transaction>
        <handle>101</handle>
            <typeIdentifier>Tran_2</typeIdentifier>
            <!-- optional element -->
         <restriction> TRUE </restriction>
        </transaction>
        <transaction>
            <handle>102</handle>
            <restriction> TRUE </restriction>
        </transaction>
        <atomic>
            <handle>1</handle>
                <!-- Optional Element -->
            <typeIdentifier>Security_Authorization_failure</typeIdentifier>
        </atomic>
        <atomic>
            <handle>1</handle>
        </atomic>
        <poll>
            <handle>1</handle>
                <!-- Optional Element -->
            <typeIdentifier>Poll_1</typeIdentifier>
                <!-- Optional Element -->
            <callbackInterval>1</callbackInterval>
                <!-- Optional Element -->
            <restriction> False </restriction>
        </poll>
        <poll>
            <handle>1</handle>
        </poll>
        <count>
            <handle>3</handle>
            <typeIdentifier>Download_file-count</typeIdentifier>
                <!-- Must be a float   -->
            <aggregationInterval>15.0</aggregationInterval>
                <!-- Optional Element -->
            <topNSize>10</topNSize>
                <!-- Optional Element 0...n, Content MUST be unique -->
            <restriction> TRUE </restriction>
            <collapseDimension>File_type1</collapseDimension>
            <collapseDimension>File_type2</collapseDimension>
```

```xml
            <collapseDimension>File_type3</collapseDimension>
            <collapseDimension>File_type4</collapseDimension>
            <collapseDimension>File_type5</collapseDimension>
            <collapseDimension>Invoker_ID1</collapseDimension>
            <collapseDimension>Invoker_ID2</collapseDimension>
            <restriction> FAIL </restriction>
            <collapseDimension>Invoker_ID3</collapseDimension>
            <collapseDimension>Invoker_ID4</collapseDimension>
        </count>
        <count>
            <handle>3</handle>
            <typeIdentifier>Count_2</typeIdentifier>
            <aggregationInterval>150.1</aggregationInterval>
        </count>
        <sum>
            <handle>4</handle>
                <!-- Optional Element -->
            <typeIdentifier>SumType</typeIdentifier>
                <!-- Must be a float    -->
            <aggregationInterval>20000.00001</aggregationInterval>
                <!-- Optional Element -->
            <topNSize>9</topNSize>
                <!-- Optional 0...n element(s), content MUST be unique-->
            <collapseDimension>Coll_Dim_1</collapseDimension>
             <restriction> TRUE </restriction>
            <collapseDimension>Coll_Dim_2</collapseDimension>
            <restriction> FALSE </restriction>
            <collapseDimension>Coll_Dim_3</collapseDimension>
            <collapseDimension>Coll_Dim_4</collapseDimension>
        </sum>
        <sum>
            <handle>4</handle>
            <typeIdentifier>SumType_2</typeIdentifier>
            <aggregationInterval>200.0</aggregationInterval>
        </sum>
        <threshold>
            <handle>5</handle>
                <!-- Optional Element -->
            <restriction> TRUE </restriction>
                <!-- Optional Element -->
            <typeIdentifier>ThreshType</typeIdentifier>
                <!-- Must be a float    -->
            <aggregationInterval>1.025</aggregationInterval>
                <!-- Optional Element -->
            <topNSize>11</topNSize>
                <!-- Optional 0..n element(s), content MUST be unique -->
            <collapseDimension>Coll_Dim_1</collapseDimension>
            <collapseDimension>Coll_Dim_2</collapseDimension>
            <collapseDimension>Coll_Dim_3</collapseDimension>
                <!-- Must be a float    -->
            <thresholdValue>30.0</thresholdValue>
        </threshold>
        <threshold>
            <handle>50</handle>
            <aggregationInterval>10250.0</aggregationInterval>
            <thresholdValue>300.0</thresholdValue>
        </threshold>
    </configList>
</xamConfigure>
```

*F. Report*

The "report" document contains the measurement results. Several periods may be combined in one documents.

```xml
<?xml version="1.0"?>
<xamReport xmlns="http://www.e-speak.net/schema/XAM/report" >
    <timeBase>2000-04-18T17:43:30.140-08:00</timeBase>
    <reportInterval>2nd 1.313</reportInterval>
    <!-- a bundle should contain only one repetitive sibling element. -->
    <bundle>
        <handle>100</handle>
        <typeIdentifier>testPollData_100</typeIdentifier>
        <pollData>
                <!-- Content in Name Elemant must be unique -->
                <!--   OR Content in value element must be unique -->
            <variableValue>
                <name>aStringVar1</name>
                <value>long in the tooth1</value>
            </variableValue>
        </pollData>
        <pollData>
```

```xml
                    <variableValue>
                            <name>aStringVar2</name>
                            <value>long in the tooth1</value>
                    </variableValue>
            </pollData>
            <pollData>
                    <variableValue>
                            <name>aStringVar1</name>
                            <value>long in the tooth2</value>
                    </variableValue>
            </pollData>
            <pollData>
                    <variableValue>
                            <name>aStringVar2</name>
                            <value>long in the tooth2</value>
                    </variableValue>
            </pollData>
            <pollData>
                    <!-- other instance data here -->
            </pollData>
            <!-- other instance data here -->
    </bundle>
    <bundle>
            <handle>2nd 2</handle>
            <typeIdentifier>2nd testTransaction</typeIdentifier>
            <transactionData>
                    <!-- Element Content must be unique -->
                    <instanceID>1</instanceID>
                    <!-- Optional Element -->
                    <parentCorrelator>2nd null</parentCorrelator>
                    <timeBase>2nd 2000-04-18T17:43:30.250-08:00</timeBase>
                    <duration>2nd 0.11</duration>
                    <status> 2nd The status is still very good today .,. </status>
                    <!-- Content in Name Elemant must be unique -->
                    <variableValue>
                            <name>aStringVar1</name>
                            <value>long in the tooth string1</value>
                    </variableValue>
                    <variableValue>
                            <name>aStringVar1</name>
                            <value>2nd long in the tooth string2</value>
                    </variableValue>
                    <variableValue>
                            <name>aStringVar2</name>
                            <value>long in the tooth string1</value>
                    </variableValue>
                    <variableValue>
                            <name>aStringVar2</name>
                            <value>2nd long in the tooth string2</value>
                    </variableValue>
                    <variableValue>
                            <name>2nd aLongVar</name>
                            <value>2nd 82</value>
                    </variableValue>
                    <variableValue>
                            <name>2nd aLongKeyVar</name>
                            <value>2nd 83</value>
                    </variableValue>
                    <variableValue>
                            <name>2nd aDoubleVar</name>
                            <value>2nd 86.1459</value>
                    </variableValue>
            </transactionData>
            <transactionData>
                    <instanceID>2</instanceID>
                    <timeBase>2000-04-18T17:43:30.250-08:00</timeBase>
                    <duration>0.11</duration>
                    <status>The status is still very good today .,. </status>
                    <variableValue>
                            <name>aStringVar1</name>
                            <value>long in the tooth string1</value>
                    </variableValue>
            </transactionData>
            <transactionData>
                    <instanceID>3</instanceID>
                    <timeBase>2nd 2000-04-18T17:43:30.250-08:00</timeBase>
                    <duration>2nd 0.11</duration>
                    <status> 2nd The status is still very good today .,. </status>
                    <variableValue>
                            <name>aStringVar1</name>
                            <value>long in the tooth string1</value>
                    </variableValue>
```

```xml
        </transactionData>
</bundle>
<bundle>
        <handle>2nd 1</handle>
        <typeIdentifier>2nd testAtomic</typeIdentifier>
        <atomicData>
                <!-- element is optional -->
                <parentCorrelator>2nd test_r</parentCorrelator>
                <timeBase>2nd 2000-04-18T17:43:30.250-08:00</timeBase>
                <variableValue>
                        <name>2nd aStringVar</name>
                        <value>2nd long in the tooth</value>
                </variableValue>
                <variableValue>
                        <name>2nd aStringKeyVar</name>
                        <value>2nd long in the tooth with a key hole</value>
                </variableValue>
                <variableValue>
                        <name>2nd aLongVar</name>
                        <value>2nd 1111111122222222233333333</value>
                </variableValue>
                <variableValue>
                        <name>2nd aLongKeyVar</name>
                        <value>2nd 88884444422222</value>
                </variableValue>
                <variableValue>
                        <name>2nd aDoubleVar</name>
                        <value>2nd 87.1459</value>
                </variableValue>
        </atomicData>
        <atomicData>
                <timeBase>2nd 2000-04-18T17:43:30.250-08:00</timeBase>
                <variableValue>
                        <name>2nd aStringVar</name>
                        <value>2nd long in the tooth</value>
                </variableValue>
        </atomicData>
        <atomicData>
                <timeBase>2nd 2001-04-18T17:43:30.250-08:00</timeBase>
                <variableValue>
                <name>2nd aStringVar</name>
                        <value>2nd long in the tooth</value>
                </variableValue>
                <!-- other instance data here -->
        </atomicData>
        <!-- other instance data here -->
<bundle>
        <handle>6</handle>
        <typeIdentifier>testTransaction:sum:Duration</typeIdentifier>
        <sumData>
                <timeBase>2000-04-18T17:43:28.500-08:00</timeBase>
                <aggregationInterval>null</aggregationInterval>
                <Ex>2.0620000000000003</Ex>
                <Ex2>0.24450000000000002</Ex2>
                <N>18.0</N>
                <Max>0.203</Max>
                <Min>0.109</Min>
        </sumData>
        <sumData>
                <timeBase>2000-04-18T17:43:28.500-08:01</timeBase>
                <aggregationInterval>null</aggregationInterval>
                <Ex>2.0620000000000003</Ex>
                <Ex2>0.24450000000000002</Ex2>
                <N>18.0</N>
                <Max>0.203</Max>
                <Min>0.109</Min>
        </sumData>
</bundle>
<bundle>
        <!-- handle context must be unique -->
        <handle>3</handle>
        <typeIdentifier>testAtomic:count</typeIdentifier>
        <countData>
                <timeBase>2000-04-18T17:43:28.484-08:00</timeBase>
                <aggregationInterval>null</aggregationInterval>
                <count>18</count>
        </countData>
</bundle>
<bundle>
        <handle>4</handle>
        <typeIdentifier>testAtomic:count</typeIdentifier>
        <countData>
```

```xml
                <timeBase>2000-04-18T17:43:28.484-08:00</timeBase>
                <aggregationInterval>null</aggregationInterval>
                <count>18</count>
            </countData>
            <countData>
                <timeBase>2000-04-18T17:43:28.484-08:00</timeBase>
                <aggregationInterval>null</aggregationInterval>
                <!-- count content must be unique if everything else is equal -->
                <count>19</count>
            </countData>
        </bundle>
        <!-- not shown here: Count with TopN -->
        <!-- not shown here: Group with or without TopN -->
        <!-- not shown here: Sum with or without TopN -->
        <!-- not shown here: Threshold with or without TopN -->

</xamReport>
```

G. Close

The "close" document contains a description of the closure reason or nothing. If either the XAM enabled application or the XAM service receives a close message they should reply with another close message and cease further communication. If either party has send a close message they should not send further close messages upon receipt of a close message.

```xml
<?xml version="1.0"?>
<xamClose xmlns="http://www.espeak.org/XAM/close">
</xamClose>
```

H. Info

The "info" document contains some information that is outside the scope of measurements. For example if an error occurs then an info message could be sent indicating what happened and what action has been taken. Implementations should be more tolerant of info messages containing unexpected element that they may be for other documents.

```xml
<?xml version="1.0"?>
<xamInfo xmlns="http://www.espeak.org/XAM/info">
        <badDocument>
                <documentName>xamConfig</documentName>
                <status>ignored</status>
                <reason>invalid xml</reason>
        </badDocument>
</xamInfo>
```

I. Schemas

TBC

J. Example Java usage

1. test.java

```java
import net.espeak.management.xam.*;
import net.espeak.management.xam.clock.*;

/**
 * This is a example program which uses the XAM interface.
 */
public class test implements XAMCallbackInterface {

/**
     * the entry point.
     * @param args command line arguments
     */
    public static void main(String[] args) {
        System.out.println("XAM test running");
        XAMTime time = XAMClock.getTime();
        System.out.println("The time is:" + time.getISO8601Format());

test t = new test();

t.theMain(args);
    }

/**
```

```
 * the instance main
 * @param args command line arguments
 */
void theMain(String[] args) {
    XAMSession s = XAMFactory.createSession("test application v1.0",
            "15.144.69.251:pid=12312");

// disk_utilization example
    XAMVariableSpec du[] = {
            s.createDoubleVariableSpec("Utilization", new String[] {"0..100"},
        "percent", "the ammount of time the disk was busy"),
            s.createLongVariableSpec("Disk", true, new String[] {"1..i"}, null,
        "the disk being used"),
            s.createStringVariableSpec("User", true, null, null,
                    "the user utilizing the disk")
    };
    XAMPollType diskUtilization =
            s.newPollMeasurementType("Disk_utilization", du, this);

diskUtilization.setDescription("the percentage of the time a disk was being utilized
by a user");

// Download file example
    XAMVariableSpec df[] = {
            s.createStringVariableSpec("File_name", false, "The name of the file being
downloaded"),
            s.createStringVariableSpec("File_type", true, "The type of the file being
downloaded"),
            s.createLongVariableSpec("size", false, "the size of the file being downloaded"),
            s.createStringVariableSpec("Invoker_ID", true,
                    "the user utilizing the disk")
    };
    XAMTransactionType downloadFile =
            s.newTransactionType("Download_file", df);

downloadFile.setDescription("a file download from the file server");

// Security_Authorization_failure example
    XAMVariableSpec saf[] = {
            s.createStringVariableSpec("Conversation_type", true, "The XMI conversation
name"),
            s.createStringVariableSpec("Document_type", true, "The XML document schema
address"),
            s.createStringVariableSpec("Invoker_ID", true, "the sender of the message"),
            s.createStringVariableSpec("Recipient_ID", true, "the reciver of the message"),
            s.createStringVariableSpec("Reason_String", true,
                    "the failure reason"),
    };
    XAMAtomicType securityAuthFail =
            s.newAtomicType("Security_Authorization_failure", saf);

securityAuthFail.setDescription("a message from a remote client failed an
authorization check");

// during run time
    // disk file download
    XAMTransactionInstance dwnldfileInstance = downloadFile.begin();

dwnldfileInstance.setStringValue("File_name", "/user/web/index.html");
    dwnldfileInstance.setStringValue("File_type", "html");
    dwnldfileInstance.setLongValue("size", 23432);
    dwnldfileInstance.setStringValue("Invoker_ID", "guest");

// ... download the file here ....
    dwnldfileInstance.end();

// Authorization failure
    XAMAtomicInstance safai = securityAuthFail.getInstance();

safai.setStringValue("Conversation_type",
            "http://www.espeak.net/conversations/fdsds.xml");
    safai.setStringValue("Document_type",
            "http://www.espeak.net/documents/fsaasfdsds.xml");
    safai.setStringValue("Invoker_ID",
            "PK:SHA-1:f34Dff23rd32tre5fFG445rFrr");
    safai.setStringValue("Recipient_ID",
            "PK:SHA-1:DFsdsfHeRe85F4g55ggyh6h6v5b");
    safai.setStringValue("Reason_String",
            "auth fail code 42 (the certificate was corrupt)");
    safai.report();
}
```

```
/**
 * The call back method is in this example implemented by the application object.
 *
 * @param measurementInstance
 */
public void requestingMeasurement(XAMPollInstance measurementInstance) {
    double utilization[][] = {
        {
            34, 56, 45, 45, 56
        }, {
            45, 36, 35, 15, 76
        }, {
            39, 26, 32, 45, 56
        }
    };
    String user[] = {
        "tom", "dick", "harry"
    };
    long diskNum[] = {
        11, 12, 13, 14, 15
    };

for (int u = 0; u < user.length; u++) {
        measurementInstance.setStringValue("User", user[u]);
        for (int d = 0; d < diskNum.length; d++) {
            measurementInstance.setLongValue("disk", diskNum[d]);
            measurementInstance.setDoubleValue("Utilization",
                    utilization[u][d]);

// now post this measurement data.
            measurementInstance.postValueSet();
        }
    }
}
```

2.  *XAM Java API*

The following Java API is a first draft for the Java XAM application library.

3. *XAMFactory.java*

```
/*$Id: XAMFactory.java,v 1.1.2.4 2000/05/12 14:32:30 olima Exp $*/
/*
 ************************************************************
 *                                                          *
 * (c) Copyright 2000 Hewlett-Packard Company                *
 *                                                          *
 * This program is free software; you can redistribute it and/or modify it *
 * under the terms of the GNU Lesser General Public License as published by *
 * the Free Software Foundation; either version 2.1 of the License, or *
 * (at your option) any later version.                      *
 *                                                          *
 * This program is distributed in the hope that it will be useful, but *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                *
 *                                                          *
 * You should have received a copy of the GNU Lesser General Public License *
 * along with this program; if not, write to the Free Software Foundation, *
 * Inc., 675 Mass Ave, Cambridge, MA 02139, USA.            *
 *                                                          *
 ************************************************************
 */ package net.espeak.management.xam;
import java.lang.reflect.*;

/**
 * This class is a factory for instances of XAMSession the factory may return
 * different types of XAMSession depending on the system propertie
 * "XAM.implementation.class". The default implementation returned
 * is <code>net.espeak.management.xam.noop.NoopSession<code>
 *
 * @author David Stephenson
 *
 * @version $Revision: 1.1.2.4 $ $Date: 2000/05/12 14:32:30 $
```

```java
*/
public class XAMFactory {

/**
     * The last session object to be created. A session object is created when
     * one does not exist or for every new named session after the first named
     * session.
     */
    private static XAMSessionImpl latestSession;

/**
     * indicates whether the session object in <code>latestSession</code> is named or not.
     */
    private static boolean sessionIsNamed = false;

/**
     * The system property that holds the name of the implementation class.
     */
    public static final String XAM_IMPLENTATION_PROPERTY =
        "XAM.implementation.class";

/**
     * The default noop implementation class.
     */
    public static final Class DEFAULT_XAM_IMPLEMENTATION_CLASS =
        net.espeak.management.xam.noop.NoopSession.class;

/**
     * The actual implementation class.
     */
    public static final Class theXAMImplementation =
        loadOfXAMImplementation();

/**
     * The default noop implementation class name.
     */
    public static final String DEFAULT_XAM_IMPLEMENTATION_NAME =
        DEFAULT_XAM_IMPLEMENTATION_CLASS.getName();

/**
     * The default noop implementation class name.
     */
    public static final String XAM_LOADFAILEXIT_PROPERTY =
        "XAM.implementation.loadexit";

/**
     * The default class load failure for the XAM implementation.
     * If true the library will call <code>System.exit(1);</code>
     */
    public static final String DEFAULT_XAM_LOADFAILEXIT = "false";

/**
     * Create a XAMSession instance. This should generally be called
     * once per application instance.
     * @param ApplicationVersionName an identifier for the application
     * and it's version.
     * @param ApplicationInstanceName an identifier for the application
     * instance. No other application or service of with the same
     * ApplicationVersionName should have the same ApplicationInstanceName.
     * @throws ClassNotFoundException this exception may be thrown if the XAM
     * implementaion cannot be loaded.
     */
    public static synchronized XAMSession createSession(String applicationVersionName,
        String applicationInstanceName) {

// check that the application has supplied
        // some application names with content
        if (applicationVersionName == null
            || applicationVersionName.equals("")) {
            throw new XAMException("The ApplicationVersionName cannot be empty");
        }
        if (applicationInstanceName == null
            || applicationInstanceName.equals("")) {
```

```
        throw new XAMException("The ApplicationInstanceName cannot be empty");
    }

// check if we alrady have a session created but without any
    // application names or we don't have a session yet.
    if (sessionIsNamed == true || latestSession == null) {

// we already had a named session so create a new one for the new names
        // or we don't have a session yet.
        latestSession = createSessionObject();
    }

// remember that we have a named session
    sessionIsNamed = true;

// now put the application names into the session.
    latestSession.setApplicationNames(applicationVersionName,
        applicationInstanceName);
    return latestSession;
}

/**
 * Create a XAMSession instance. This should generally be called
 * once per application instance. The Application instance will be
 * randomally generated.
 * @param ApplicationVersionName an identifier for the application
 * and it's version.
 * @throws ClassNotFoundException this exception may be thrown if the XAM
 * implementaion cannot be loaded.
 */
public static synchronized XAMSession createSession(String applicationVersionName) {

// check that the application has supplied
    // some application names with content
    if (applicationVersionName == null
        || applicationVersionName.equals("")) {
        throw new XAMException("The ApplicationVersionName cannot be empty");
    }

// check if we alrady have a session created but without any
    // application names or we don't have a session yet.
    if (sessionIsNamed == true || latestSession == null) {

// we already had a named session so create a new one for the new names
        // or we don't have a session yet.
        latestSession = createSessionObject();
    }

// remember that we have a named session
    sessionIsNamed = true;

// now put the application names into the session.
    latestSession.setApplicationName(applicationVersionName);
    return latestSession;
}

/**
 * Create a XAMSession instance.
 * This method may be called by libraries that wish to use XAM but are not
 * part of the main application logic and cannot get to the <code>
 * XAMSession</code> instance returned by the full version of this method.
 * If the full version is called once then all calls to this method
 * (before or after the full version) will return the same <code>
 * XAMSession</code> instance. If mutiple calls are made to the full
 * version then calls to this method will return the latest <code>
 * XAMSession</code> instance return from a full call.
 * At least one call must be made to the full version or no measurements
 * will be recorded.
 */
public static synchronized XAMSession createSession()
    throws ClassNotFoundException {
    if (latestSession == null) {
        latestSession = createSessionObject();
    }
    return latestSession;
}

/**
 * create an instance of XAMSession.
```

```java
 * The system property "XAM.implementation.class" is used
 * to get a class name which the method trys to load and
 * create and instance of.
 *
 * @return the newly created XAM session.
 */
private static XAMSessionImpl createSessionObject() {
    try {
        Class xamSessionClass = loadOfXAMImplementation();
        XAMSessionImpl theSession =
            (XAMSessionImpl)xamSessionClass.newInstance();

// now check the the session can initialze itself
        // sucessfully
        theSession.initialze();

return theSession;
    } catch (Exception e) {
        // keep trying not to throw any exceptions from this method
        return new net.espeak.management.xam.noop.NoopSession();
    }
}

/**
 * return the name of the implmentation class that we should load and use
 *
 * @return a fully qualified class name
 */
private static String implementationClassName() {
    String implClass = System.getProperty(XAM_IMPLENTATION_PROPERTY,
        DEFAULT_XAM_IMPLEMENTATION_NAME);

return implClass;
}

/**
 * make sure the implementation is on the class path when this class is
 * loaded to avoid late failure due to the implementation not being on
 * the classpath. If class not found and the property
 * XAM_LOADFAILEXIT_PROPERTY == 'true' the program will be halted
 * with <code>System.exit(1);</code> otherwise the noop implementation
 * will be returned.
 */
private static Class loadOfXAMImplementation() {
    Class implementationClass = DEFAULT_XAM_IMPLEMENTATION_CLASS;
    try {
        // try to load the class in the system property.
        String implementationName = implementationClassName();

if (implementationName == null) {
            // property not set so return noop class
            return DEFAULT_XAM_IMPLEMENTATION_CLASS;
        } try {
            // load the class
            implementationClass = Class.forName(implementationName);
        } catch(ClassNotFoundException e) {
            // failed to load the class
            if("true".equals(System.getProperty(XAM_LOADFAILEXIT_PROPERTY,
                DEFAULT_XAM_LOADFAILEXIT))) {
                // we should exit so rethrow exception
                throw e;
            } else {
                // just use the default.
                return DEFAULT_XAM_IMPLEMENTATION_CLASS;
            }
        }
        // check that the class actually subclasses the impl class
        if (XAMSession.class.isAssignableFrom(XAMSessionImpl.class) == false) {
            if ("true".equals(System.getProperty(XAM_LOADFAILEXIT_PROPERTY,
                DEFAULT_XAM_LOADFAILEXIT))) {
                throw new ClassNotFoundException("The XAM implemenetation class"
                    + " must extend:"
                    + net.espeak.management.xam.XAMSession.class.getName());
            } else {
                // just use the default.
                return DEFAULT_XAM_IMPLEMENTATION_CLASS;
            }
        }
```

```
        } catch (ClassNotFoundException e) {
            // a failure and the fail property set to false so exit.
            System.err.println("failed to load XAM implementation class: "
                + implementationClassName());
            System.err.println("XAM implementation class name is set in the system property
as: "
                + implementationClassName());
            System.err.println(e.toString());
            System.exit(1);
            return null;
        }
        return implementationClass;
    }
}

4.      XAMSession java

/*$Id: XAMSession.java,v 1.1.2.3 2000/05/18 21:14:57 zs Exp $*/
/*
 **************************************************************************
 *                                                                        *
 * (c) Copyright 2000 Hewlett-Packard Company                             *
 *                                                                        *
 * This program is free software; you can redistribute it and/or modify it *
 * under the terms of the GNU Lesser General Public License as published by *
 * the Free Software Foundation; either version 2.1 of the License, or    *
 * (at your option) any later version.                                    *
 *                                                                        *
 * This program is distributed in the hope that it will be useful, but    *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                              *
 *                                                                        *
 * You should have received a copy of the GNU Lesser General Public License *
 * along with this program; if not, write to the Free Software Foundation, *
 * Inc., 675 Mass Ave, Cambridge, MA 02139, USA.                          *
 *                                                                        *
 **************************************************************************
 */
package net.espeak.management.xam;

/**
 * This is the central type registration object from the applications
 * point of view. Calls are made on instances of this class inorder
 * to create measurement type instances.
 *
 * @author David Stephenson
 *
 * @version $Revision: 1.1.2.3 $ $Date: 2000/05/18 21:14:57 $
 */
public interface XAMSession {

/**
     * create a new transaction type.
     * @param typeIdentifier a unique name for the transaction
     * measurement type.
     * @param variables an array of variable specifications
     * @param group this transaction type is to be included in
     * some XAMGroup's.
     * May be null or empty.
     */
    public abstract XAMTransactionType newTransactionType(String typeIdentifier,
        XAMVariableSpec variables[]) throws XAMException;

/**
     * create a new atomic type.
     * @param typeIdentifier a unique name for the atomic measurement type.
     * @param variables an array of variable specifications
     * @param topN this atomic type is to be included in some XAMGroup's.
     * May be null or empty.
     */
    public abstract XAMAtomicType newAtomicType(String typeIdentifier,
        XAMVariableSpec variables[]) throws XAMException;

/**
```

```
* register a double callback object with the session. This will
* cause the creation of a sample measurement.
* @param valueName a unique name for this value.
* @param variables an array of variable specifications
* @param callbackObject an object which must implement the
* XAMDoubleValue interface.
*/
public abstract XAMPollType newPollMeasurementType(String typeIdentifier,
    XAMVariableSpec variables[],
    XAMCallbackInterface callback) throws XAMException;

/**
* create a variable specification which can be used when calling the
* methods above.
* @param name the name of the variable. must be unqiue within a
* measurement type.
* @param isKey set to true if the variable could be used to cut the
* data but not be summed or thresholded.
* @param Alphabet the scope of possible values for the variable.
* E.g for  a string { "ready", "running", "stopped" }
* or for a long or double a range spec { "11","12","15","32..126" }
* @param unit A string describing the unit of the variable. E.g.
* 'kilos', 'sessions', 'requests', 'seconds'
* @param description Can contain any string, might contain a URL
* to a localization service.
*/
public abstract XAMVariableSpec createStringVariableSpec(String name,
    boolean isKey, String[] alphabet, String unit,
    String description) throws XAMException;

/**
* create a variable specification which can be used when calling the
* methods above.
* @param name the name of the variable. must be unqiue within a
* measurement type.
* @param isKey set to true if the variable could be used to cut the
* data but not be summed or thresholded.
* @param Alphabet the scope of possible values for the variable.
* E.g for  a string { "ready", "running", "stopped" }
* or for a long or double a range spec { "11","12","15","32..126" }
* @param unit A string describing the unit of the variable. E.g.
* 'kilos', 'sessions', 'requests', 'seconds'
* @param description Can contain any string, might contain a URL
* to a localization service.
*/
public abstract XAMVariableSpec createLongVariableSpec(String name,
    boolean isKey, String[] alphabet, String unit,
    String description) throws XAMException;

/**
* create a variable specification which can be used when calling the
* methods above.
* @param name the name of the variable. must be unqiue within a
* measurement type.
* @param isKey set to true if the variable could be used to cut the
* data but not be summed or thresholded.
* @param Alphabet the scope of possible values for the variable.
* E.g for  a string { "ready", "running", "stopped" }
* or for a long or double a range spec { "11","12","15","32..126" }
* @param unit A string describing the unit of the variable. E.g.
* 'kilos', 'sessions', 'requests', 'seconds'
* @param description Can contain any string, might contain a URL
* to a localization service.
*/
public abstract XAMVariableSpec createDoubleVariableSpec(String name,
    String[] alphabet, String unit,
    String description) throws XAMException;

/**
* create a long variable specification which can be used when calling the
* methods above.
* @param name the name of the variable. must be unqiue within a
* measurement type.
* @param className one of "string", "long" or "double".
* @param isKey set to true if the variable could be used to cut the data
* but not be summed or thresholded.
* @param description Can contain any string, might contain a URL to a
* localization service.
```

```
    */
    public XAMVariableSpec createLongVariableSpec(String name, boolean isKey,
        String description) throws XAMException;

/**
    * create a string variable specification which can be used when calling the
    * methods above.
    * @param name the name of the variable. must be unqiue within a
    * measurement type.
    * @param className one of "string", "long" or "double".
    * @param isKey set to true if the variable could be used to cut the data
    * but not be summed or thresholded.
    * @param description Can contain any string, might contain a URL to a
    * localization service.
    */
    public XAMVariableSpec createStringVariableSpec(String name,
        boolean isKey, String description) throws XAMException;

/**
    * create a double variable specification which can be used when calling the
    * methods above.
    * @param name the name of the variable. must be unqiue within a
    * measurement type.
    * @param className one of "string", "long" or "double".
    * @param isKey set to true if the variable could be used to cut the data
    * but not be summed or thresholded.
    * @param description Can contain any string, might contain a URL to a
    * localization service.
    */
    public XAMVariableSpec createDoubleVariableSpec(String name,
        String description) throws XAMException ;

/**
    * Can be used by the application to check if the <code>XAMSession</code>
    * implemenetation have recvied configuration information from the XAM
    * service. An application may wait until this value is true inorder not
    * to loose any measurement data. Applications should not wait idenfiatly
    * for a true value as the XAM library may not find a XAM service.
    */
    public boolean configured();
}
```

5. *XAMMeasurementType.java*

```
/*$Id: XAMMeasurementType.java,v 1.1.2.2 2000/05/08 01:04:13 ds Exp $*/
/*
***********************************************************************
*                                                                     *
* (c) Copyright 2000 Hewlett-Packard Company                          *
*                                                                     *
* This program is free software; you can redistribute it and/or modify it
* under the terms of the GNU Lesser General Public License as published by
* the Free Software Foundation; either version 2.1 of the License, or
* (at your option) any later version.                                 *
*                                                                     *
* This program is distributed in the hope that it will be useful, but *
* WITHOUT ANY WARRANTY; without even the implied warranty of MERCHANTABILITY *
* or FITNESS FOR A PARTICULAR PURPOSE. See the GNU Lesser General Public *
* License for more details.                                           *
*                                                                     *
* You should have received a copy of the GNU Lesser General Public License
* along with this program; if not, write to the Free Software Foundation,
* Inc., 675 Mass Ave, Cambridge, MA 02139, USA.                       *
*                                                                     *
***********************************************************************
*/ package net.espeak.management.xam;

/**
* The top level class for Measurement type hierarchy.
*
* @author David Stephenson
*
* @version $Revision: 1.1.2.2 $ $Date: 2000/05/08 01:04:13 $
*/
public interface XAMMeasurementType {
```

```
/**
 * set the description of the measurement type
 */
public void setDescription(String description);

/**
 * return the String form of the correlator for this transaction type.
 * The correlator is a unicode string of the
 * form "System Identifier!System Instance Identifier!Type
 * Identifier!"
 * May be passed by the application to
 * component application which could use it to correlate two occurrences
 *
 * @return String form of correlator.
 */
public String getCorrelatorAsString();
}
```

6.     *XAMOccuranceType.java*

```
/*$Id: XAMOccurrenceType.java,v 1.1.2.1 2000/05/08 01:04:16 ds Exp $*/
/*
 ***********************************************************************
 *                                                                     *
 * (c) Copyright 2000 Hewlett-Packard Company                          *
 *                                                                     *
 * This program is free software; you can redistribute it and/or modify it *
 * under the terms of the GNU Lesser General Public License as published by *
 * the Free Software Foundation; either version 2.1 of the License, or *
 * (at your option) any later version.                                 *
 *                                                                     *
 * This program is distributed in the hope that it will be useful, but *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                           *
 *                                                                     *
 * You should have received a copy of the GNU Lesser General Public License *
 * along with this program; if not, write to the Free Software Foundation, *
 * Inc., 675 Mass Ave, Cambridge, MA 02139, USA.                       *
 *                                                                     *
 ***********************************************************************
*/ package net.espeak.management.xam;

/**
 * This is an abstract interface no actual instances
 * of this inteface should exist. The two concrete subclasses of
 * are <code>XAMAtomicType</code> and <code>XAMTransactionType</code>
 *
 * @author David Stephenson
 *
 * @version $Revision: 1.1.2.1 $ $Date: 2000/05/08 01:04:16 $
 */
public interface XAMOccurrenceType extends XAMMeasurementType {

/**
     * If this measurement type is not currently required by the library
     * then the application could save time by not creating the value set.
     * This value may change at any time so MUST be checked on a case by
     * case basis.
     * Do not cache the return value from this method!!
     * @return indication if the measurement type is being used by the library
     */
    public boolean enabled();
}
```

7.     *XAMAtomicType.java*

```
/*$Id: XAMAtomicType.java,v 1.1.2.2 2000/05/08 01:04:10 ds Exp $*/
/*
 ***********************************************************************
 *                                                                     *
 * (c) Copyright 2000 Hewlett-Packard Company                          *
 *                                                                     *
 * This program is free software; you can redistribute it and/or modify it *
 * under the terms of the GNU Lesser General Public License as published by *
 * the Free Software Foundation; either version 2.1 of the License, or *
```

```
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
 *
 ***********************************************************************
 */ package net.espeak.management.xam;

/**
 * One instance of this class should exist for every Atomic measurement
 * type registered by the application. Each time the application
 * wishes to record an instance of this measurement type the
 * <code>getInstance</code> method must be called to create
 * a new instance of a measurement.
 *
 * @author David Stephenson
 *
 * @version $Revision: 1.1.2.2 $ $Date: 2000/05/08 01:04:10 $
 */
public interface XAMAtomicType extends XAMOccurrenceType {

/**
     * Indicate that the Atomic Occurrence has happened.Each time the
     * application wishes to record an instance of this measurement
     * type the this method must be called to create a new instance
     * of a measurement.
     *
     * @return atomic measurement instance
     */
    public XAMAtomicInstance getInstance();
}
```

8. XAMTransactionType.java

```
/*$Id: XAMTransactionType.java,v 1.1.2.2 2000/05/08 01:04:18 ds Exp $*/
/*
 ***********************************************************************
 *
 * (c) Copyright 2000 Hewlett-Packard Company
 *
 * This program is free software; you can redistribute it and/or modify it
 * under the terms of the GNU Lesser General Public License as published by
 * the Free Software Foundation; either version 2.1 of the License, or
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
 *
 ***********************************************************************
 */ package net.espeak.management.xam;
import net.espeak.management.xam.clock.XAMTime;

/**
 * One instance of this class should exist for every Transaction measurement
 * registered by the application. Each time the application
 * wishes to record an instance of this measurement type one of the
 * <code>begin()</code> methods must be called to create
 * a new instance of a transaction measurement.
 *
```

```
* @author David Stephenson
*
* @version $Revision: 1.1.2.2 $ $Date: 2000/05/08 01:04:18 $
*/
public interface XAMTransactionType extends XAMOccurrenceType {

/**
     * Inform XAM that a new transaction has just started.
     * @return a new instance of transaction measurement.
     */
    public XAMTransactionInstance begin();

/**
     * Inform XAM about a new transaction that started some time ago.
     * @param time the time instant the transaction started.
     * @return a new instance of transaction measurement.
     */
    public XAMTransactionInstance began(XAMTime time) throws XAMException;

/**
     * Inform XAM about a new transaction that started some time ago.
     * @param time the time instant the transaction started. The value should
     * be in ISO 8601 format. Only time values generated from XAM
     * libraries should be used here.
     * @return a new instance of transaction measurement.
     */
    public XAMTransactionInstance began(String time) throws XAMException;
}
```

9.      *XAMOccuranceInstance.java*

```
/*$Id: XAMOccurrenceInstance.java,v 1.1.2.1 2000/05/08 01:04:15 ds Exp $*/
/*
 *****************************************************************
 *                                                               *
 * (c) Copyright 2000 Hewlett-Packard Company                    *
 *                                                               *
 * This program is free software; you can redistribute it and/or modify it *
 * under the terms of the GNU Lesser General Public License as published by *
 * the Free Software Foundation; either version 2.1 of the License, or *
 * (at your option) any later version.                           *
 *                                                               *
 * This program is distributed in the hope that it will be useful, but *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                     *
 *                                                               *
 * You should have received a copy of the GNU Lesser General Public License *
 * along with this program; if not, write to the Free Software Foundation, *
 * Inc., 675 Mass Ave, Cambridge, MA 02139, USA.                 *
 *                                                               *
 *****************************************************************
 */ package net.espeak.management.xam;

/**
 * This is an abstract interface no actual instances
 * of this inteface should exist. The two concrete subclasses of
 * are <code>XAMAtomicInstance</code> and <code>XAMTransactionInstance</code>
 *
 * @author David Stephenson
 *
 * @version $Revision: 1.1.2.1 $ $Date: 2000/05/08 01:04:15 $
 */
public interface XAMOccurrenceInstance extends XAMMeasurementInstance {

/**
     * set the parent instance correlator. The correlator is a combination of
     * System Identifier, System Instance Identifier, Type
     * Identifier and Type Instance Identifier.
     * @param parentInstance the instance identifier of the parent.
     */
    public void setParentCorrelator(XAMOccurrenceInstance parentInstance)
```

```
        throws XAMException;

/**
     * set the parent instance correlator. The correlator is a unicode string
     * of the form "System Identifier!System Instance Identifier!Type
     * Identifier!Type Instance Identifier"
     * @param parentInstance the instance identifier of the parent in String
     * form.
     */
    public void setParentCorrelator(String parentCorrelator)
        throws XAMException;
}
```

10.     *XAMTransactionInstance.java*

```
/*$Id: XAMTransactionInstance.java,v 1.1.2.2 2000/05/08 01:04:17 ds Exp $*/
/*
 ************************************************************************
 *                                                                      *
 * (c) Copyright 2000 Hewlett-Packard Company                           *
 *                                                                      *
 * This program is free software; you can redistribute it and/or modify it *
 * under the terms of the GNU Lesser General Public License as published by *
 * the Free Software Foundation; either version 2.1 of the License, or  *
 * (at your option) any later version.                                  *
 *                                                                      *
 * This program is distributed in the hope that it will be useful, but  *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                            *
 *                                                                      *
 * You should have received a copy of the GNU Lesser General Public License *
 * along with this program; if not, write to the Free Software Foundation, *
 * Inc., 675 Mass Ave, Cambridge, MA 02139, USA.                        *
 *                                                                      *
 ************************************************************************
 */
package net.espeak.management.xam;
import net.espeak.management.xam.clock.XAMTime;

/**
 * An instance of a Transaction measurement. Instances are created from
 * a XAMTransactionType object. Instances of this class can only be used
 * to report one measurement. Each time a new transaction measurement
 * occures a new instance of this class must be created.
 *
 * @author David Stephenson
 *
 * @version $Revision: 1.1.2.2 $ $Date: 2000/05/08 01:04:17 $
 */
public interface XAMTransactionInstance extends XAMOccurrenceInstance {

/**
     * Indicate that the transactions has finished sucessfully the completed field
     * will be set to 'OK'. Measurement data will be generated for this instance.
     * All the variables that are defined for this measurement type need to be set
     * before calling this method.
     */
    public void end();

/**
     * Indicate that the transactions has finished abnormally the completed field
     * will be set to 'FAIL'. Measurement data will be generated for this instance.
     * All the variables that are defined for this measurement type need to be set
     * before calling this method.
     */
    public void abort();

/**
     * indicate that the transaction should be ignored for measurement
     * purposes. This might be used in cases such as transaction rollback
     * or transaction failure. where a different measurement type should
     * now be used. Measurement data will NOT be generated for this instance.
     */
    public void remove();
```

```
    /**
     * the time that the transaction started
     * @return the start time
     */
    public XAMTime startTime();

/**
     * return the String form of the correlator for this transaction instance.
     * The correlator is a unicode string of the
     * form 'System Identifier!System Instance Identifier!Type
     * Identifier!Type Instance Identifier'
     * May be passed by the application to
     * component application which could use it to correlate two occurrences
     *
     * @return String form of correlator.
     */
    public String getCorrelatorAsString();
}
```

*11.    XAMCallbackInterface.java*

```
/*$Id: XAMCallbackInterface.java,v 1.1.2.3 2000/05/18 21:14:56 zs Exp $*/
/*
 ********************************************************************
 *                                                                  *
 * (c) Copyright 2000 Hewlett-Packard Company                       *
 *                                                                  *
 * This program is free software; you can redistribute it and/or modify it *
 * under the terms of the GNU Lesser General Public License as published by *
 * the Free Software Foundation; either version 2.1 of the License, or *
 * (at your option) any later version.                              *
 *                                                                  *
 * This program is distributed in the hope that it will be useful, but *
 * WITHOUT ANY WARRANTY; without even the implied warranty of MERCHANTABILITY *
 * or FITNESS FOR A PARTICULAR PURPOSE.  See the GNU Lesser General Public *
 * License for more details.                                        *
 *                                                                  *
 * You should have received a copy of the GNU Lesser General Public License *
 * along with this program; if not, write to the Free Software Foundation, *
 * Inc., 675 Mass Ave, Cambridge, MA 02139, USA.                    *
 *                                                                  *
 ********************************************************************
 */ package net.espeak.management.xam;

/**
 * This is the Poll measurement callback inteface. Some application
 * class must implement this inteface if the application registers Poll
 * measurements.
 *
 * @author David Stephenson
 *
 * @version $Revision: 1.1.2.3 $ $Date: 2000/05/18 21:14:56 $
 */
public interface XAMCallbackInterface {

/**
     * This method is called by the XAM library every time it wishes to sample
     * the measurement. The application must make calls on the <code>
     * measurementInstance</code> object to post the measurement data.
     * References to the measurementInstance object should not be kept after
     * the method returns. Runtime exceptions thrown from implementations of this
     * method will be treated as a return.
     *
     * @see XAMPollInstance
     * @param measurementInstance
     */
    public void requestingMeasurement(XAMPollInstance measurementInstance);
}
```

*12.    XAMAtomicInstance.java*

```
/*$Id: XAMAtomicInstance.java,v 1.1.2.2 2000/05/08 01:04:09 ds Exp $*/
/*
 ********************************************************************
```

```
 * (c) Copyright 2000 Hewlett-Packard Company
 *
 * This program is free software; you can redistribute it and/or modify it
 * under the terms of the GNU Lesser General Public License as published by
 * the Free Software Foundation; either version 2.1 of the License, or
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
 *
 ************************************************************************
 */
package net.espeak.management.xam;

/**
 * An instance of an Atomic measurement. Instances are created from
 * a XAMAtomicType object. Instances of this class can only be used
 * to report one measurement. Each time a new atomic measurement
 * occures a new instance of this class must be created.
 *
 * @author David Stephenson
 *
 * @version $Revision: 1.1.2.2 $ $Date: 2000/05/08 01:04:09 $
 */
public interface XAMAtomicInstance extends XAMOccurrenceInstance {

/**
     * the value set data has been inserted, so the measurement library
     * can take the data. This method should be called once only per
     * object instance. If the method is called twice then an exception
     * will be thrown.
     */
    public void report();
}
```

13.    XAMPollingType.java

```
/*$Id: XAMPollType.java,v 1.1.2.1 2000/05/18 21:19:18 zs Exp $*/
/*
 ************************************************************************
 *
 * (c) Copyright 2000 Hewlett-Packard Company
 *
 * This program is free software; you can redistribute it and/or modify it
 * under the terms of the GNU Lesser General Public License as published by
 * the Free Software Foundation; either version 2.1 of the License, or
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
 *
 ************************************************************************
 */
package net.espeak.management.xam;

/**
 * One instance of this class should exist for every Poll measurement
 * registered by the application.
 *
 * @author David Stephenson
 *
 * @version $Revision: 1.1.2.1 $ $Date: 2000/05/18 21:19:18 $
 */
```

```
public interface XAMPollType extends XAMMeasurementType {

/**
     * Return the name of the type which was registered by the application.
     * @returns the name the application gave to this Poll type.
     */
    public String getTypeIdentifier();
}
```

14. XAMException.java

```
/*$Id: XAMException.java,v 1.1.2.2 2000/05/08 01:04:11 ds Exp $*/
/*
 ****************************************************************************
 *                                                                          *
 * (c) Copyright 2000 Hewlett-Packard Company                               *
 *                                                                          *
 * This program is free software; you can redistribute it and/or modify it  *
 * under the terms of the GNU Lesser General Public License as published by *
 * the Free Software Foundation; either version 2.1 of the License, or      *
 * (at your option) any later version.                                      *
 *                                                                          *
 * This program is distributed in the hope that it will be useful, but      *
 * WITHOUT ANY WARRANTY; without even the implied warranty of MERCHANTABILITY *
 * or FITNESS FOR A PARTICULAR PURPOSE.  See the GNU Lesser General Public  *
 * License for more details.                                                *
 *                                                                          *
 * You should have received a copy of the GNU Lesser General Public License *
 * along with this program; if not, write to the Free Software Foundation,  *
 * Inc., 675 Mass Ave, Cambridge, MA 02139, USA.                            *
 *                                                                          *
 ****************************************************************************
 */ package net.espeak.management.xam;

/**
 * The XAM library passes all runtime errors as instatnces of this exception
 * type.
 * The XAM library will only throw exception is the case of bad usage by the
 * application.
 * If the XAM library sufferers an internal error or cannot reach the XAM
 * service no exceptions will be thrown. If the application is programmed
 * correctly this exception will not be thrown.
 *
 * @author David Stephenson
 *
 * @version $Revision: 1.1.2.2 $ $Date: 2000/05/08 01:04:11 $
 */
public class XAMException extends RuntimeException {

/**
     * Create a XAM Exception
     *
     * @param msg
     */
    public XAMException(String msg) {
        super(msg);
    }
}
```

15. XAMClock.java

```
/*$Id: XAMClock.java,v 1.1.2.5 2000/05/18 21:14:59 zs Exp $*/
/*
 ****************************************************************************
 *                                                                          *
 * (c) Copyright 2000 Hewlett-Packard Company                               *
 *                                                                          *
 * This program is free software; you can redistribute it and/or modify it  *
 * under the terms of the GNU Lesser General Public License as published by *
 * the Free Software Foundation; either version 2.1 of the License, or      *
 * (at your option) any later version.                                      *
 *                                                                          *
 * This program is distributed in the hope that it will be useful, but      *
 * WITHOUT ANY WARRANTY; without even the implied warranty of MERCHANTABILITY *
 * or FITNESS FOR A PARTICULAR PURPOSE.  See the GNU Lesser General Public  *
 * License for more details.                                                *
 *
```

```
* You should have received a copy of the GNU Lesser General Public License   *
* along with this program; if not, write to the Free Software Foundation,    *
* Inc., 675 Mass Ave, Cambridge, MA 02139, USA.                              *
*                                                                            *
******************************************************************************
*/ package net.espeak.management.xam.clock;
import java.lang.reflect.*;
import java.text.SimpleDateFormat;
import net.espeak.management.xam.XAMException;

/**
 * This is class gives access to the most accurate time available.
 * The clock will use an implementation class as per the system property
 *
 * @author David Stephenson
 *
 * @version $Revision: 1.1.2.5 $ $Date: 2000/05/18 21:14:59 $
 */
public class XAMClock {
    /**
     * the time now.
     * @return the current time.
     */
    public static XAMTime getTime();

/**
     * the clock resolution in seconds. i.e the smallest measurable
     * difference in time that the clock can produce.
     * @return the clock resolution time in seconds.
     */
    public static double getClockResolution();

/**
     * create a XAMTime object from a string in ISO 8601 format.
     * ISO (International Organization for Standardization). Representations
     * of dates and times, 1988-06-15.
     * Available at: http://www.iso.ch/markete/8601.pdf
     * @return a string containing a time instant in the form
     * "CCYY-MM-DDThh:mm:ss.ssssss" or with time zone offset
     * eg "CCYY-MM-DDThh:mm:ss.ssssss+hh:mm"
     */
    public static XAMTime getTimeFromString(String time);

/**
     * create an instance of XAMSession.
     * The system property "XAM.implementation.class" is used
     * to get a class name which the method trys to load and
     * create and instance of.
     *
     * @return the newly created XAM session.
     */
    private static XAMClockImpl createClock();

/**
     * check that the time string is in ISO 8601 format.
     * ISO (International Organization for Standardization). Representations
     * of dates and times, 1988-06-15.
     * Available at: http://www.iso.ch/markete/8601.pdf
     * @return a string containing a time instant in the form
     * "CCYY-MM-ddThh:mm:ss.ssssss" or with time zone offset
     * "CCYY-MM-ddThh:mm:ss.ssssss+hh:mm" or "CCYY-MM-ddThh:mm:ss.ssssss-hh:mm"
     */
    public static void checkTime(String time);
}
```

*16.  XAMTime.java*

```
/*$Id: XAMTime.java,v 1.1.2.4 2000/05/18 21:14:59 zs Exp $*/
/*
******************************************************************************
*                                                                            *
*                                                                            *
* (c) Copyright 2000 Hewlett-Packard Company                                 *
*                                                                            *
```

```
 * This program is free software; you can redistribute it and/or modify it
 * under the terms of the GNU Lesser General Public License as published by
 * the Free Software Foundation; either version 2.1 of the License, or
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
 *
 ****************************************************************************
 */ package net.espeak.management.xam.clock;

/**
 * This type is used by XAM to hold a time instant. There are no methods to
 * convert to/from java time formats. This is to discourage pollution of the
 * XAM time system from the java time system which may be different.
 *
 * @author David Stephenson
 *
 * @version $Revision: 1.1.2.4 $ $Date: 2000/05/18 21:14:59 $
 */
public interface XAMTime {

/**
     * return the time in ISO 8601 format.
     * ISO (International Organization for Standardization). Representations
     * of dates and times, 1988-06-15.
     * Available at: http://www.iso.ch/markete/8601.pdf
     * @return a string containing a time instant in the form
     * "CCYY-MM-ddThh:mm:ss.ssssss" or with time zone offset
     * "CCYY-MM-ddThh:mm:ss.ssssss+hh:mm" or "CCYY-MM-ddThh:mm:ss.ssssss-hh:mm"
     */
    String getISO8601Format();

/**
     * calculate the difference between the two times in seconds
     *
     * @param time the other time value
     */
    public double minus(XAMTime time);

/**
     * Generate a new time in the future
     *
     * @param time in seconds to be added to this time
     */
    public XAMTime plus(double time);
}
```

17.     *XAMMeasurementInstance.java*

```
/*$Id: XAMMeasurementInstance.java,v 1.1.2.1 2000/05/08 01:04:13 ds Exp $*/
/*
 ****************************************************************************
 *
 * (c) Copyright 2000 Hewlett-Packard Company
 *
 * This program is free software; you can redistribute it and/or modify it
 * under the terms of the GNU Lesser General Public License as published by
 * the Free Software Foundation; either version 2.1 of the License, or
 * (at your option) any later version.
 *
 * This program is distributed in the hope that it will be useful, but
 * WITHOUT ANY WARRANTY; without even the implied warranty of MERCHANTABILITY
 * or FITNESS FOR A PARTICULAR PURPOSE.  See the GNU Lesser General Public
 * License for more details.
 *
 * You should have received a copy of the GNU Lesser General Public License
 * along with this program; if not, write to the Free Software Foundation,
 * Inc., 675 Mass Ave, Cambridge, MA 02139, USA.
```

```
 *                                                                          *
 ****************************************************************************
 */
package net.espeak.management.xam;

/**
 * Through this interface several variable values may be set by the application.
 * The correct method must be called depending on the class type specified in the
 * variable declaration. A value may be writen more than once if necessary.
 *
 * @author David Stephenson
 *
 * @version $Revision: 1.1.2.1 $ $Date: 2000/05/08 01:04:13 $
 */
public interface XAMMeasurementInstance {

/**
     * set a value of a variable.
     * @param name name of the variable.
     * @param value the value of the variable.
     */
    public void setStringValue(String name, String value) throws XAMException;

/**
     * set a value of a variable.
     * @param name name of the variable.
     * @param value the value of the variable.
     */
    public void setLongValue(String name, long value) throws XAMException;

/**
     * set a value of a variable.
     * @param name name of the variable.
     * @param value the value of the variable.
     */
    public void setDoubleValue(String name, double value) throws XAMException;
}
```

The invention claimed is:

1. A method for instrumenting a software program, the method comprising the steps of:
embedding within the software program a user-defined measurement type instance based one of a plurality of predefined measurement types, wherein the user-defined measurement type instance includes a measurement type designation and associated variables, wherein the user-defined measurement type instance is associated with a data state comprising the current values of the associated variables, and wherein data structures representing the embedded user-defined measurement type instance are created and maintained by routines of a library; and
storing the data structures representing the embedded user-defined measurement type instance.

2. The method of claim 1 wherein the user-defined measurement type instance is associated with a data state comprising the current values of the associated variables, and wherein the data structures representing the embedded user-defined measurement type instance are created and maintained by routines of a library.

3. The method of claim 2 wherein the predefined measurement types include:
an atomic measurement type, a data set for which can be transmitted to the library at points in time selected by the software program;
a transaction measurement type, data collection for which can be started and ended by the software program, and, upon ending, results in transmission of a data set to the library; and
a polling measurement type, data sets for which are obtained by the library from the software program at regular intervals.

4. The method of claim 2 wherein the additional data structures representing aggregate measurement type instances based on the embedded user-defined measurement type instance are generated and stored by the library, the aggregate measurement types accumulated data over a period of time from data states generated for the embedded user-defined measurement type instance.

5. The method of claim 4 wherein aggregate measurement types include:
a count measurement type;
a group measurement type;
a sum measurement type; and
a threshold measurement type.

6. A method for collecting data by a library tangibly embodied on a computer readable medium, comprising the steps of from a user-defined measurement type instance embedded within a software program, the user-defined measurement type instance having a measurement type selected from among an atomic measurement type, a transaction measurement type, and a polling measurement type, and the library containing one or more additional aggregation measurement types based on the user-defined measurement type, the method comprising:
receiving data states, comprising current values of variables associated with the embedded user-defined measurement type instance, generated during execution of the software program;
filtering the data states;
processing data contained in the data states to produce output data according to one or more measurement type instances with which the data states are associated; and
packaging output data into reports.

7. The method of claim 6 wherein filtering of a data state further includes applying a filter expression to the variable values contained in the data state to determine whether or not to accept the data state for further processing.

8. The method of claim 7 wherein a filter expression may be associated with each measurement type instance.

9. The method of claim 6 wherein processing data contained in a data state to produce output data further includes:
selecting each measurement type instance associated with the data state;
for each selected measurement type,
if the measurement type is derived from the atomic or polling measurement type, including the variable values in the data state in the output data,
if the measurement type is derived from the transaction data type, including the variable values in the in the data state in the output data along with a calculated value equal to a transaction duration; and
if the measurement type is an aggregate measurement type, accumulating data for subsequent data output.

10. The method of claim 6 further including transmitting the reports to a data analysis component.

11. The method of claim 6 further including transmitting a description of the embedded user-defined measurement type instance and any aggregate measurement type instances based on the embedded user-defined measurement type instance to a data analysis component, which then transmits configuration information back to the library to control collection and reporting of output data.

12. A software program instrumentation system tangibly embodied on a computer readable medium comprising:
a library that manages a data structure that represents a software program with an embedded user-defined measurement type instance having a measurement type selected from among predefined measurement types and associated with variables, the library managing data structures that represent the embedded user-defined measurement type, the embedded user-defined measurement type instance, and one or more additional aggregate measurement types based on the embedded user-defined measurement type instance, the library collecting data states generated from current values of the variables associated with the embedded user-defined measurement type instance and generating reports based on the collected data states; and
a data analysis routine that configures the data structures by altering values of fields within the data structures to control data collection and reporting by the library, and that receives the generated reports from the library.

13. The software program instrumentation system of claim 12 wherein the predefined measurement types include:
an atomic measurement type, a data set for which can be transmitted to the library at points in time selected by the software program;
a transaction measurement type, data collection for which can be started and ended by the software program, and, upon ending, results in transmission of a data set to the library; and
a polling measurement type, data sets for which are obtained by the library from the software program at regular intervals.

14. The software program instrumentation system of claim 12 wherein the one or more additional aggregate measurement types are derived from predefined aggregate measurement types including:
- a count measurement type that accumulates, over a data collection interval, a count of data states associated with the embedded user-defined measurement type instance;
- a group measurement type that accumulates, over a data collection interval, a count of data states associated with the embedded user-defined measurement type instance and some number of additional embedded user-defined measurement type instances;
- a sum measurement type that accumulates, over a data collection interval, statistical quantities derived from a variable value within the data states; and
- a threshold measurement type that accumulates, over a data collection interval, a count of data states associated with the embedded user-defined measurement type instance that contain variable values that produce an acceptance output from a threshold test expression.

15. The software program instrumentation system of claim 14 wherein the sum measurement type accumulates components of statistical quantities, including median, average, and standard deviation, so the running medians, averages, and standard deviations may computed over time from multiple reports.

16. The software program instrumentation system of claim 12 wherein the library collects data states generated from current values of the variables associated with the embedded user-defined measurement type instance by:
- filtering the data states based on filtering criteria associated with each measurement type instance in order to direct a data state to each measurement type instance with which it is associated providing that the data state is accepted for the measurement type instance by the filtering criteria;
- for an accepted data state directed to a transaction measurement type instance, calculating a duration value for the transaction and including that duration value in the data state;
- for an accepted data state directed to an aggregation measurement type instance, processing the data state according to the aggregation measurement type of the aggregation measurement type instance; and
- outputting the data state for the user-defined measurement type instance, when the user-defined measurement type instance is configured for output, into a report; and
- outputting accumulated data for aggregation measurement type instances at a next accumulation interval into a report.

17. The software program instrumentation system of claim 12 wherein an aggregate measurement type instance may include key variables that control partitioning of accumulated data into a set of accumulated data, each accumulated data of the set output into a report at a next accumulation interval by the library.

18. The software program instrumentation system of claim 17 wherein only the highest values within a set of accumulated data are output into a report at a next accumulation interval by the library.

19. The software program instrumentation system of claim 12 wherein the reports are XML: documents.

* * * * *

UNITED STATES PATENT AND TRADEMARK OFFICE
CERTIFICATE OF CORRECTION

| | |
|---|---|
| PATENT NO. | : 7,111,282 B2 |
| APPLICATION NO. | : 09/880327 |
| DATED | : September 19, 2006 |
| INVENTOR(S) | : David Arthur Stephenson |

Page 1 of 1

It is certified that error appears in the above-identified patent and that said Letters Patent is hereby corrected as shown below:

In column 75, lines 17-22, delete "2. The method of claim 1 wherein the user-defined measurement type instance is associated with a data state comprising the current values of the associated variables, and wherein the data structures representing the embedded user-defined measurement type instance are created and maintained by routines of a library.".

In column 75, line 51, in Claim 6, after "of" delete "from".

In column 76, line 18, in Claim 9, after "values" delete "in the".

Signed and Sealed this

Ninth Day of March, 2010

David J. Kappos
*Director of the United States Patent and Trademark Office*